Aug. 16, 1932.  L. S. CHADWICK ET AL  1,871,951
FUEL OIL BURNING APPARATUS
Filed April 13, 1927    28 Sheets-Sheet 1

Inventors
Lee S. Chadwick
and Marc Resek
By Hull, Brock & West
Attorney

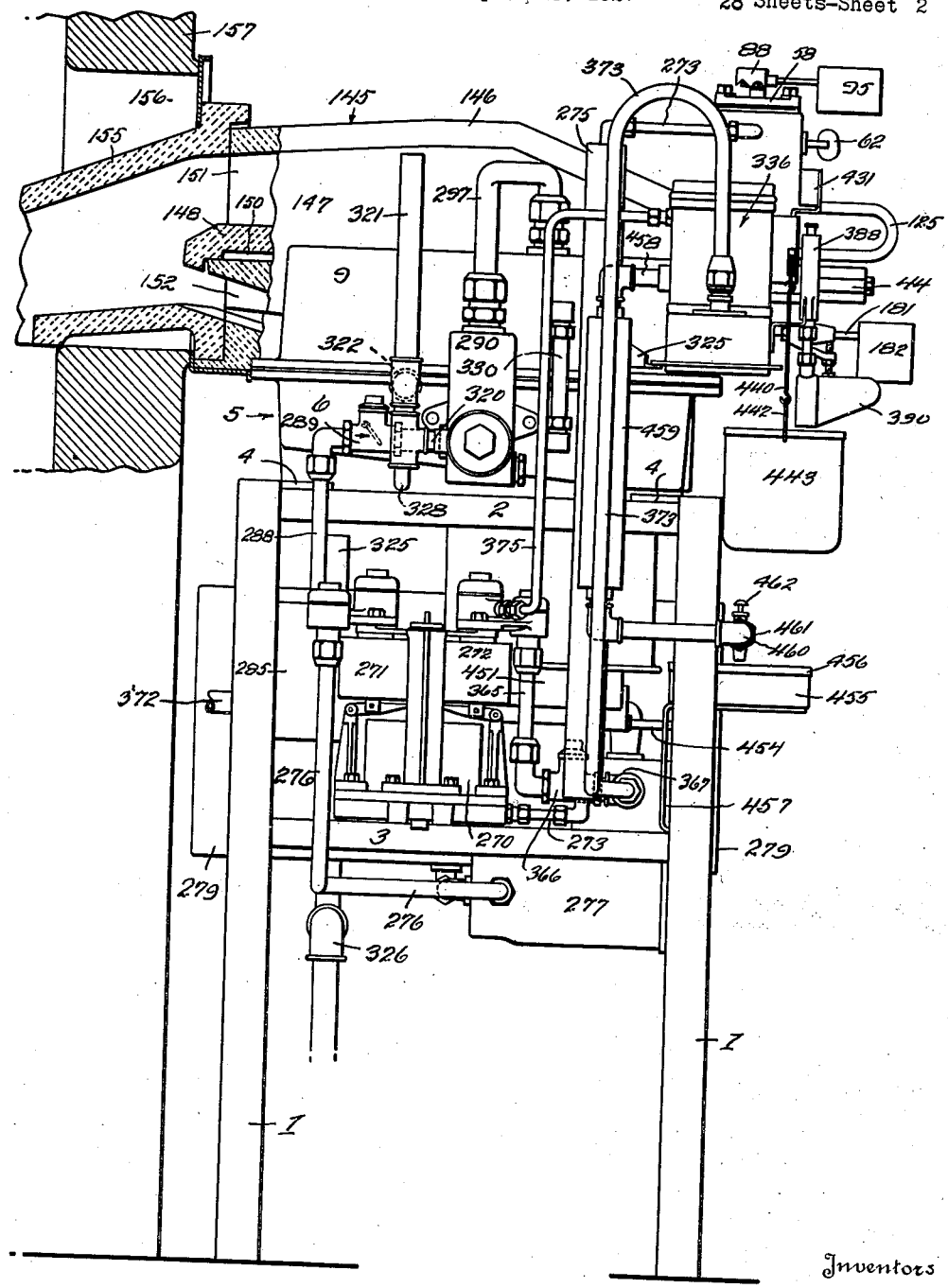

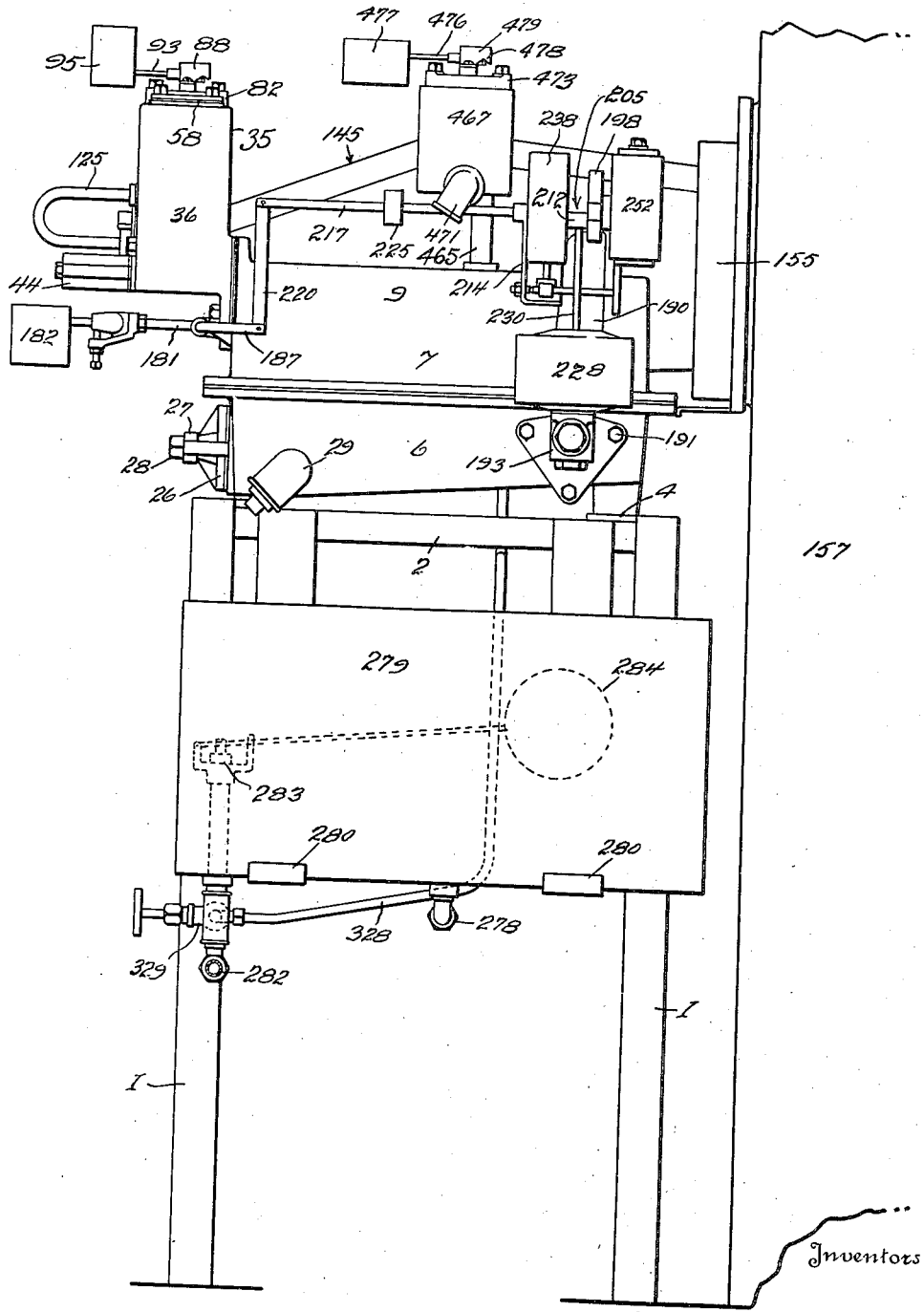

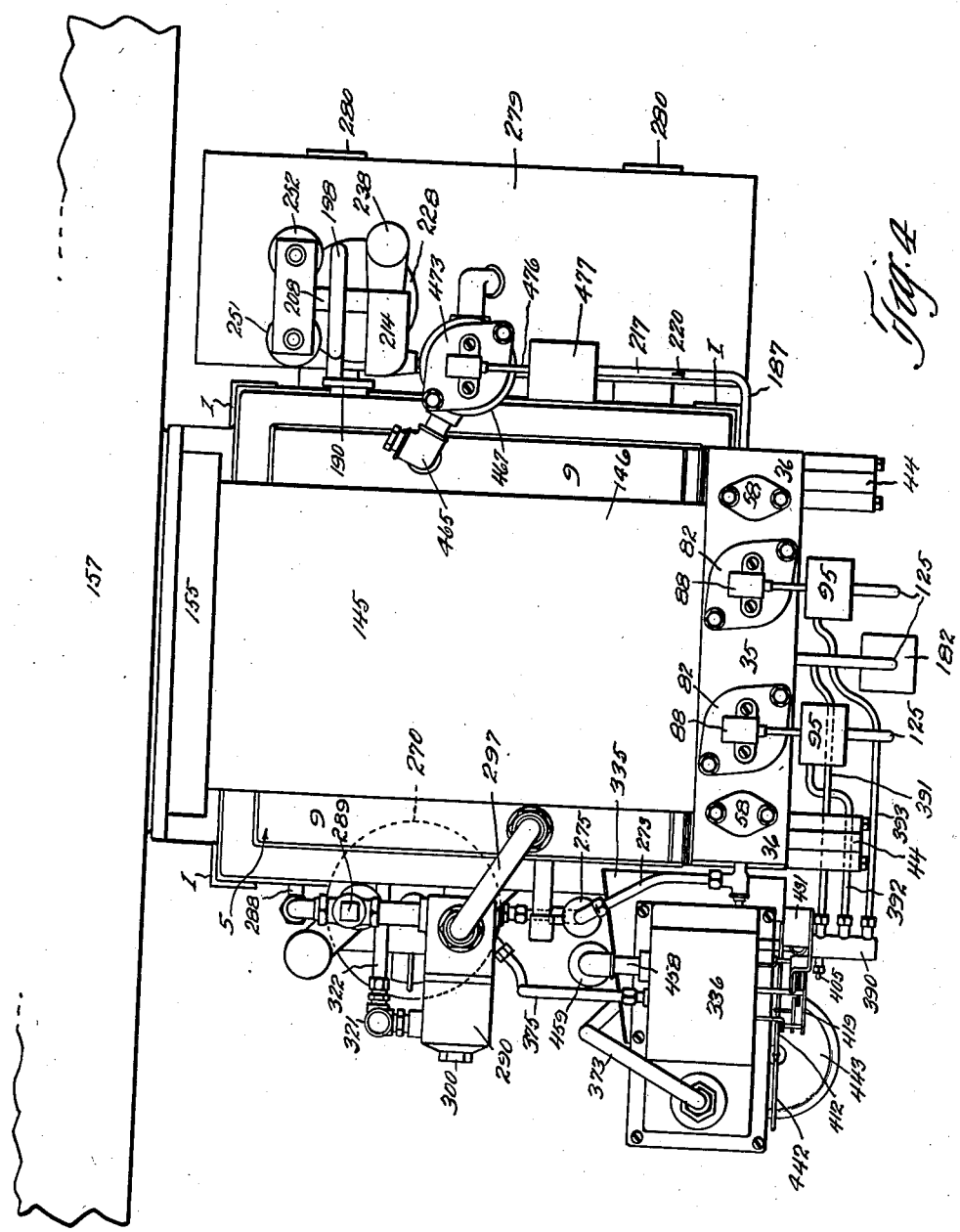

Aug. 16, 1932.　　L. S. CHADWICK ET AL　　1,871,951
FUEL OIL BURNING APPARATUS
Filed April 13, 1927　　28 Sheets-Sheet 5
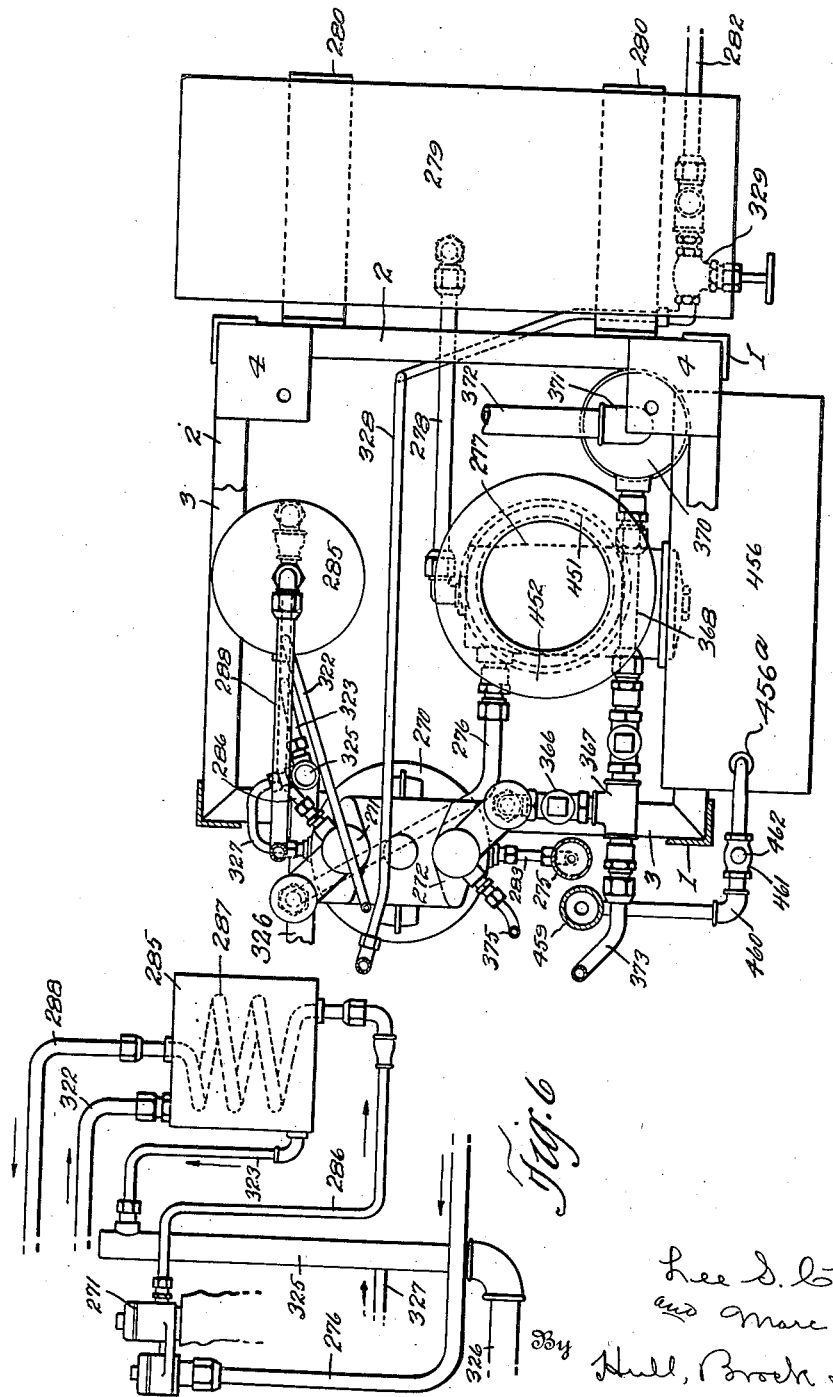

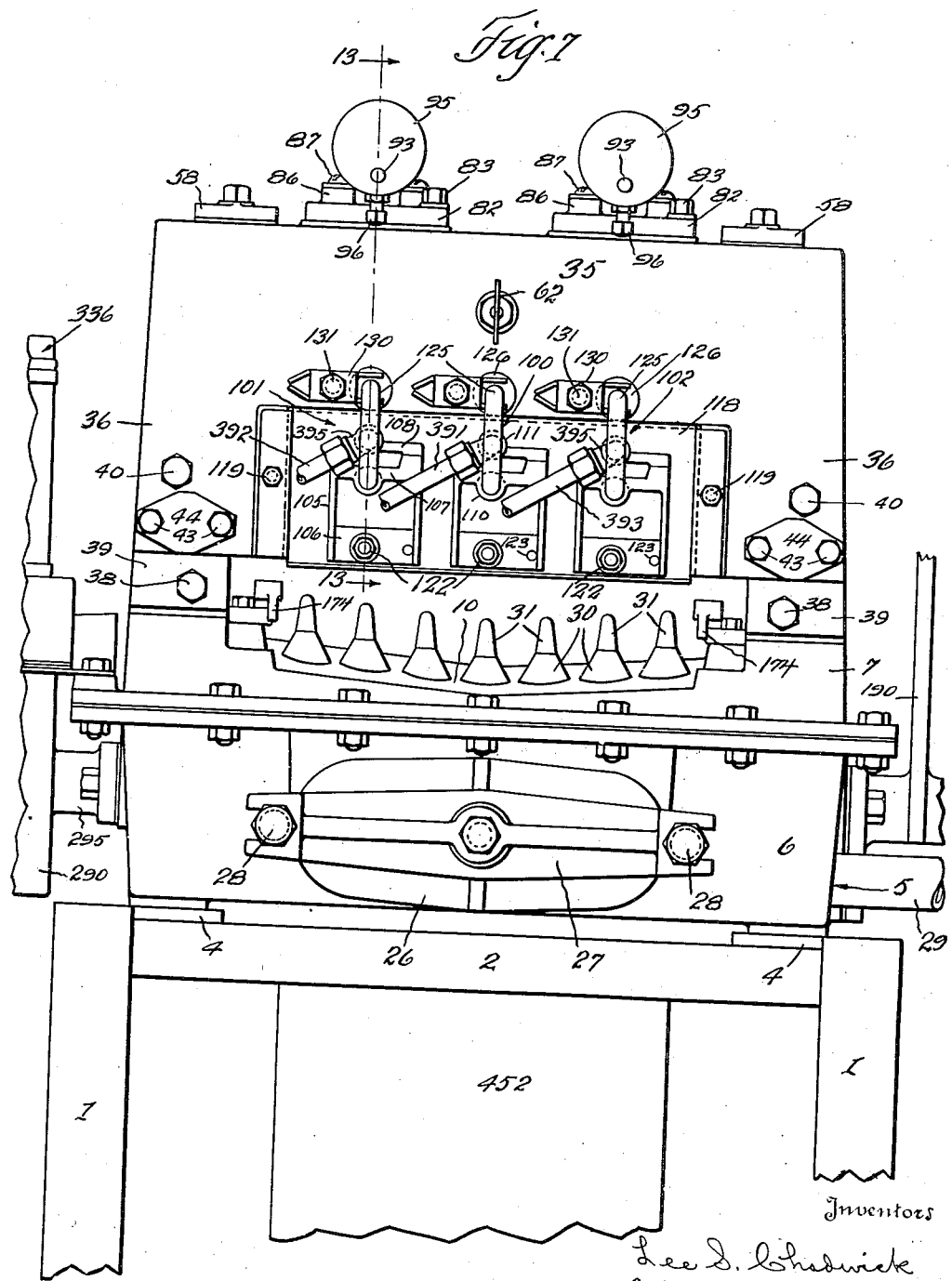

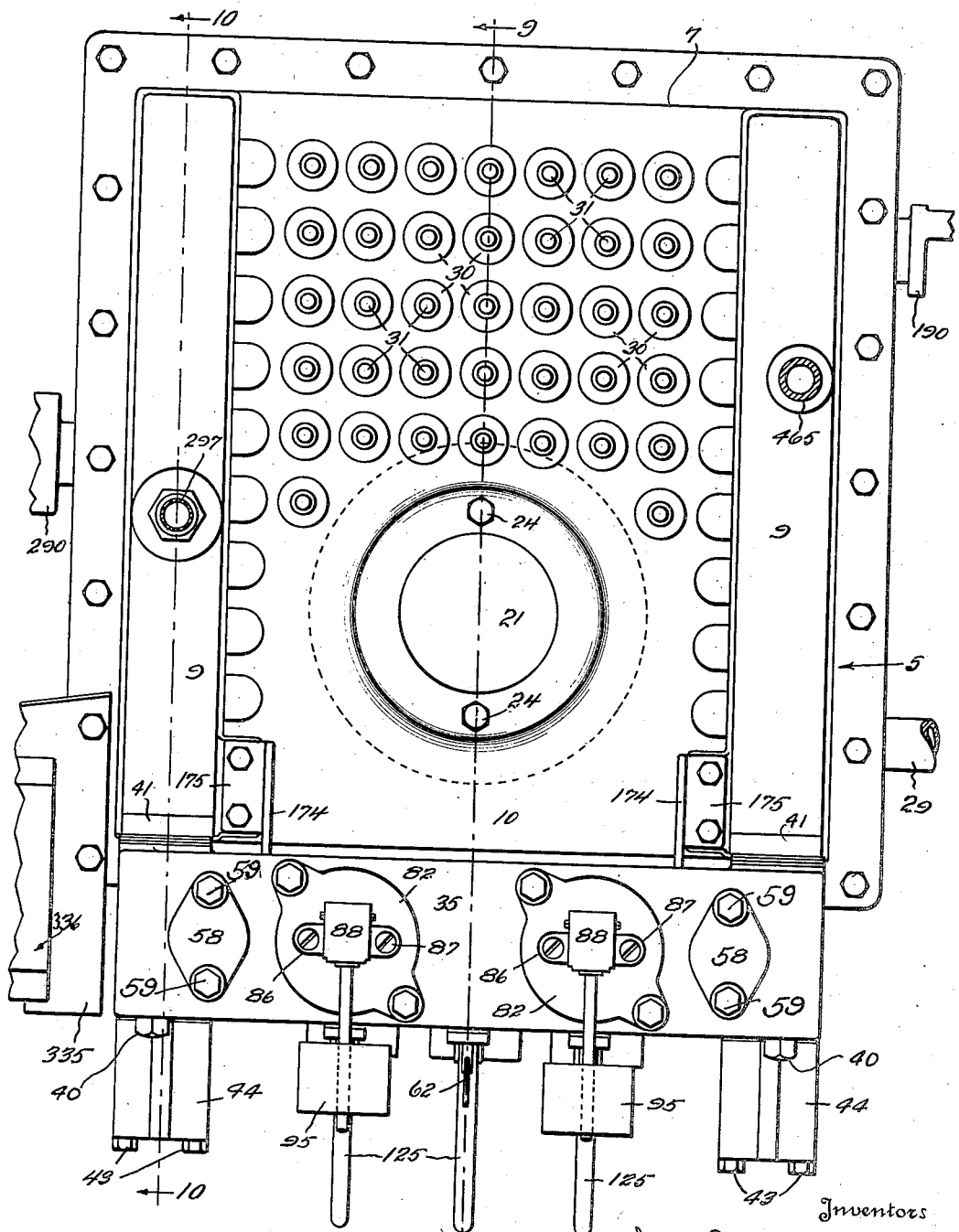

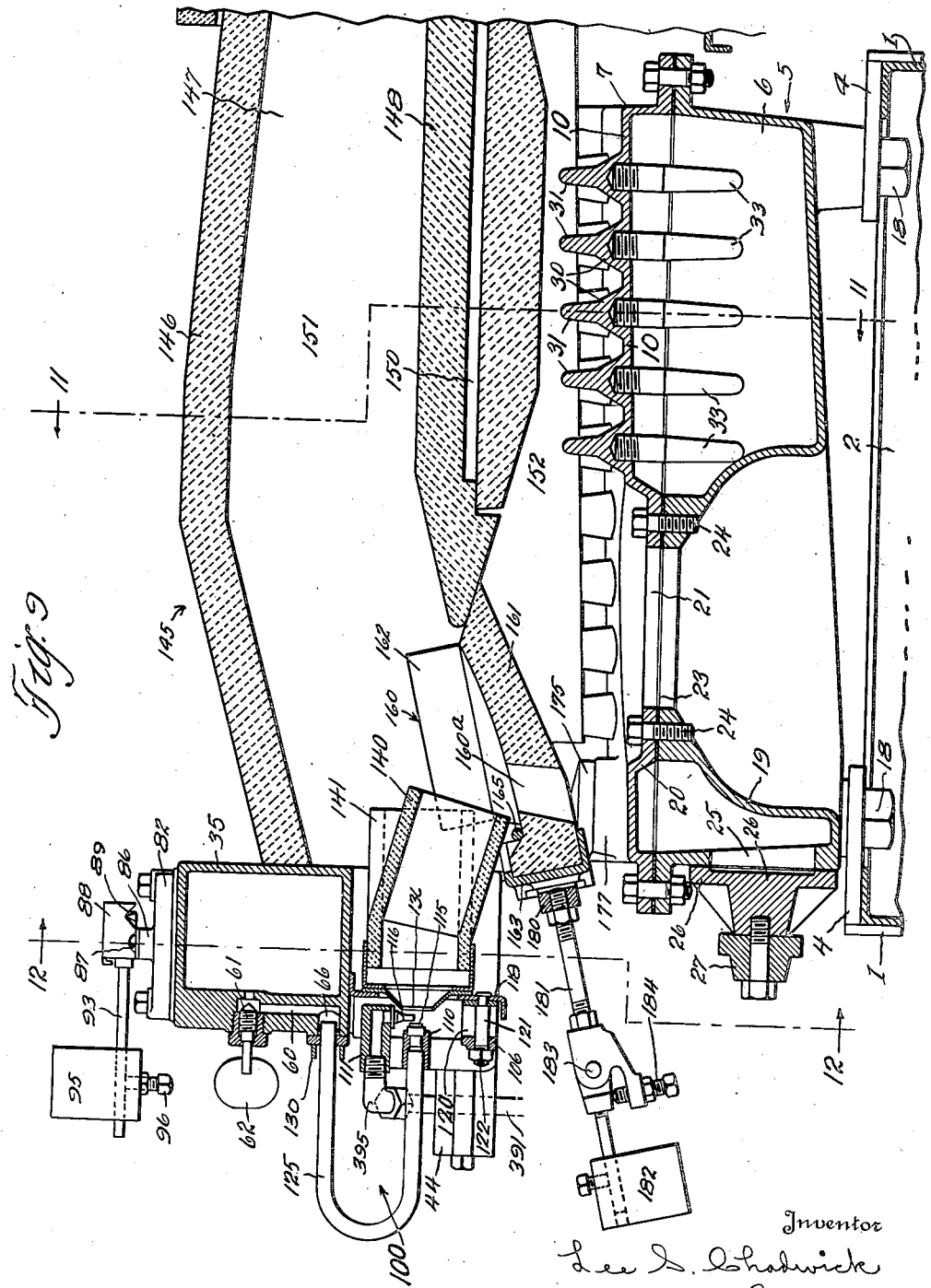

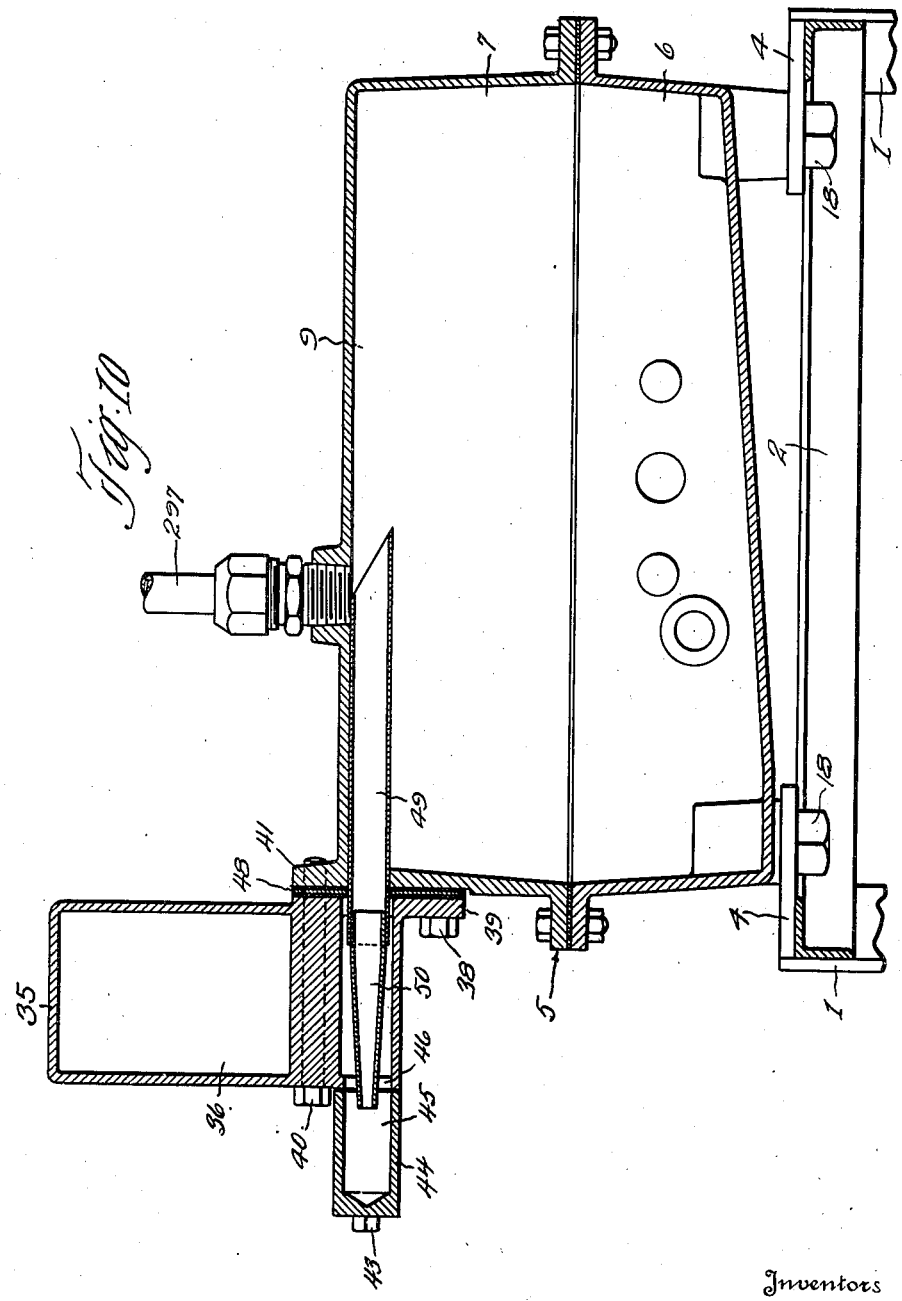

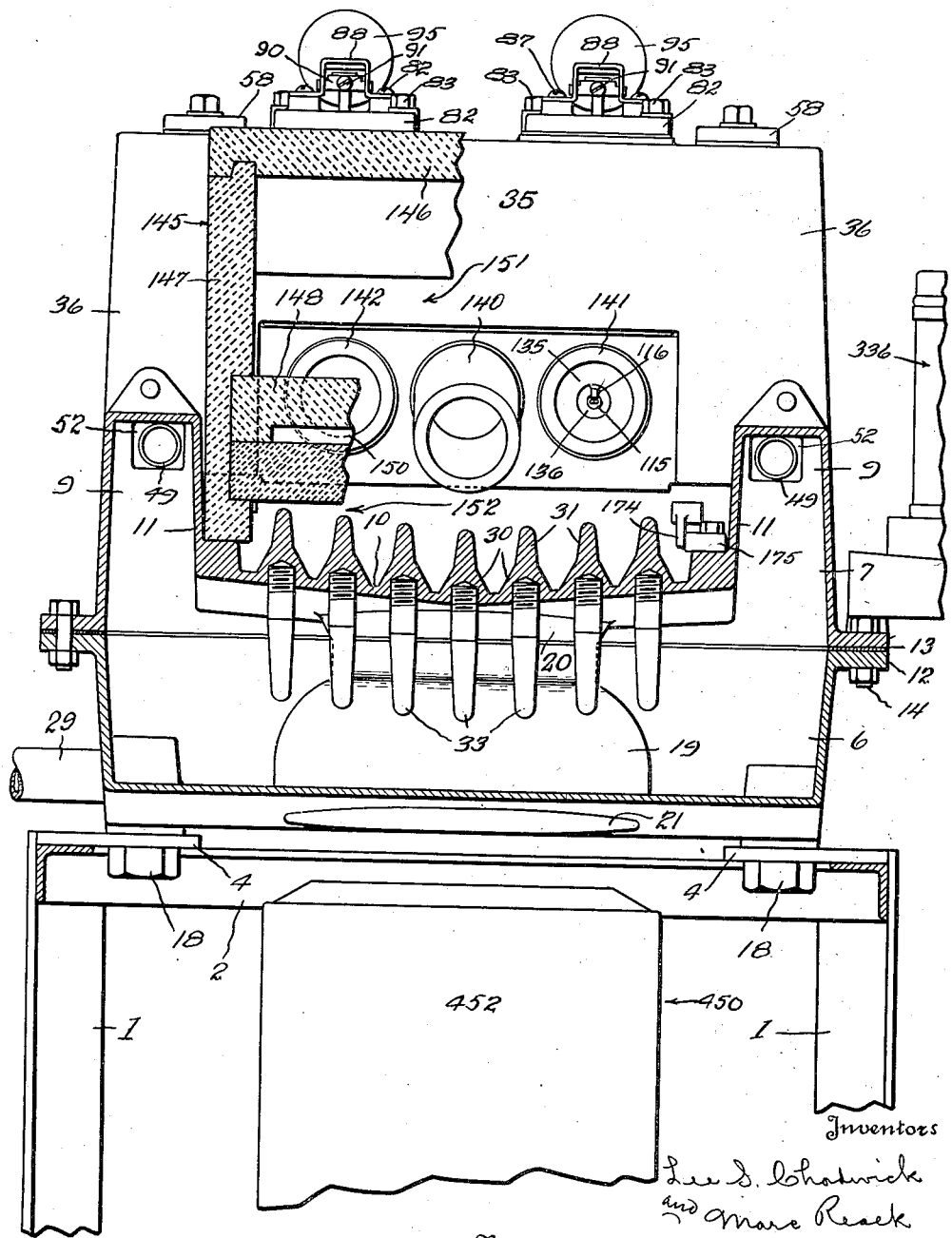

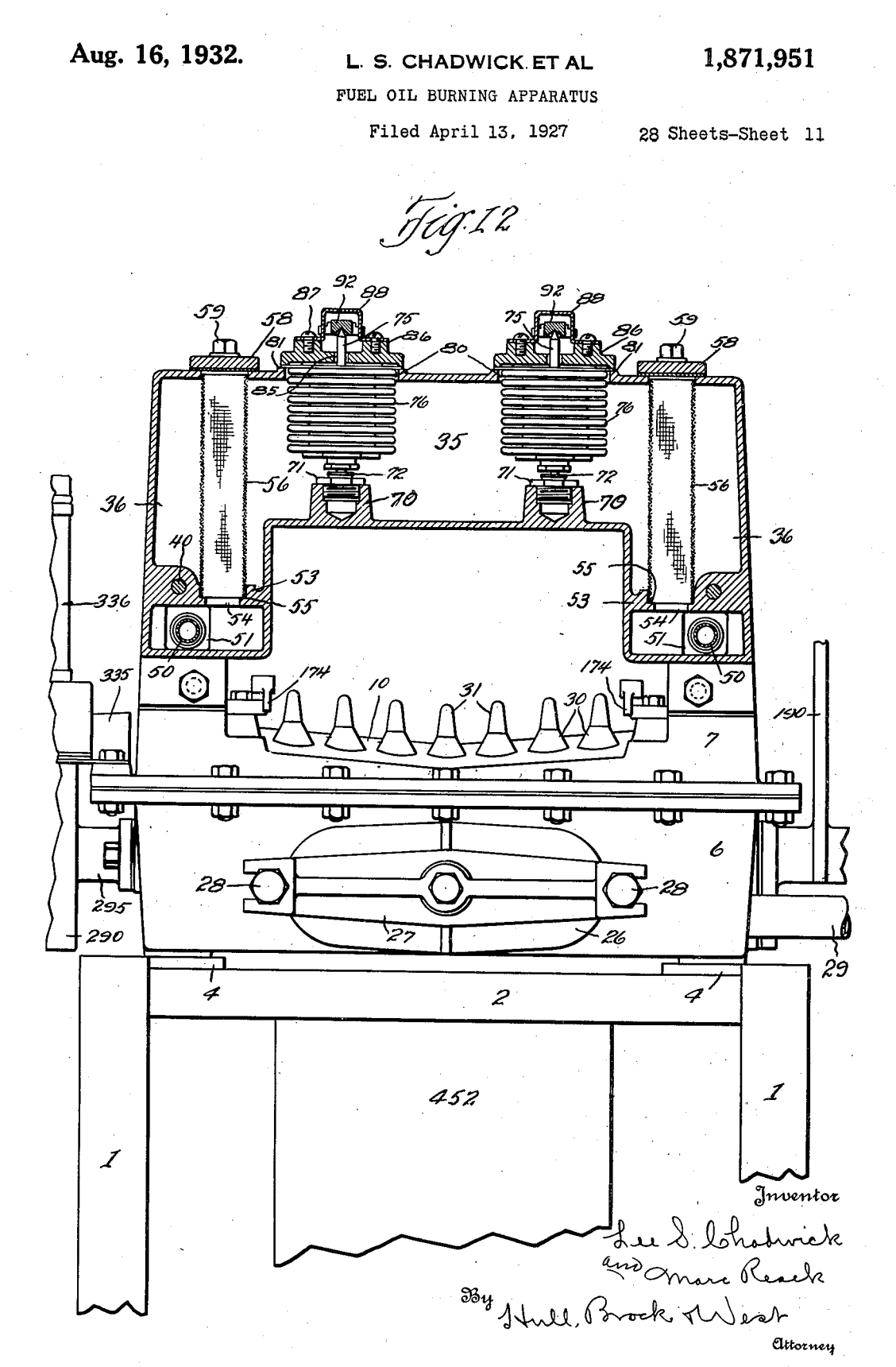

Aug. 16, 1932. L. S. CHADWICK ET AL 1,871,951
FUEL OIL BURNING APPARATUS
Filed April 13, 1927 28 Sheets-Sheet 12

Inventors
Lee S. Chadwick
and Marc Reach
By Hull, Brock & West
Attorney

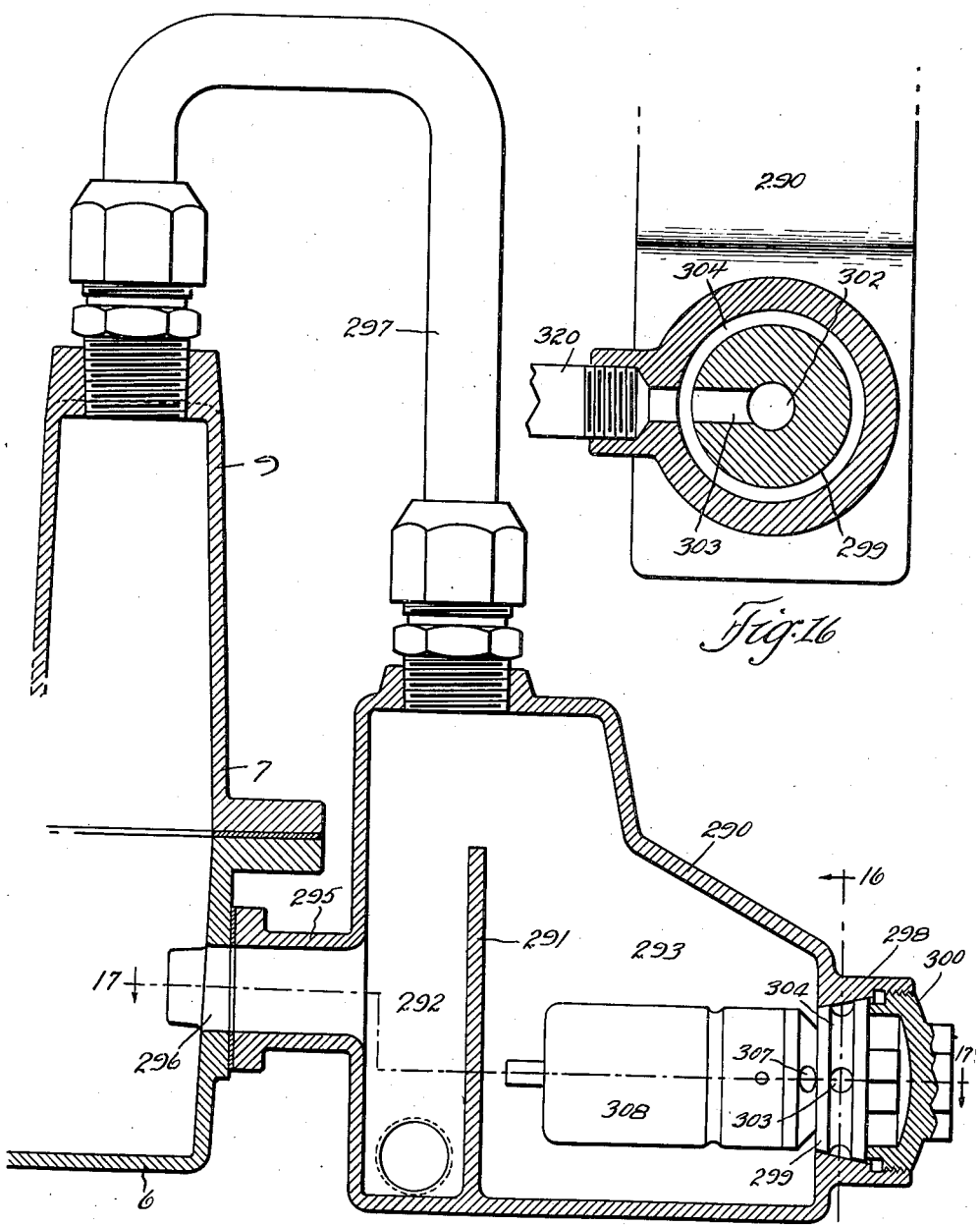

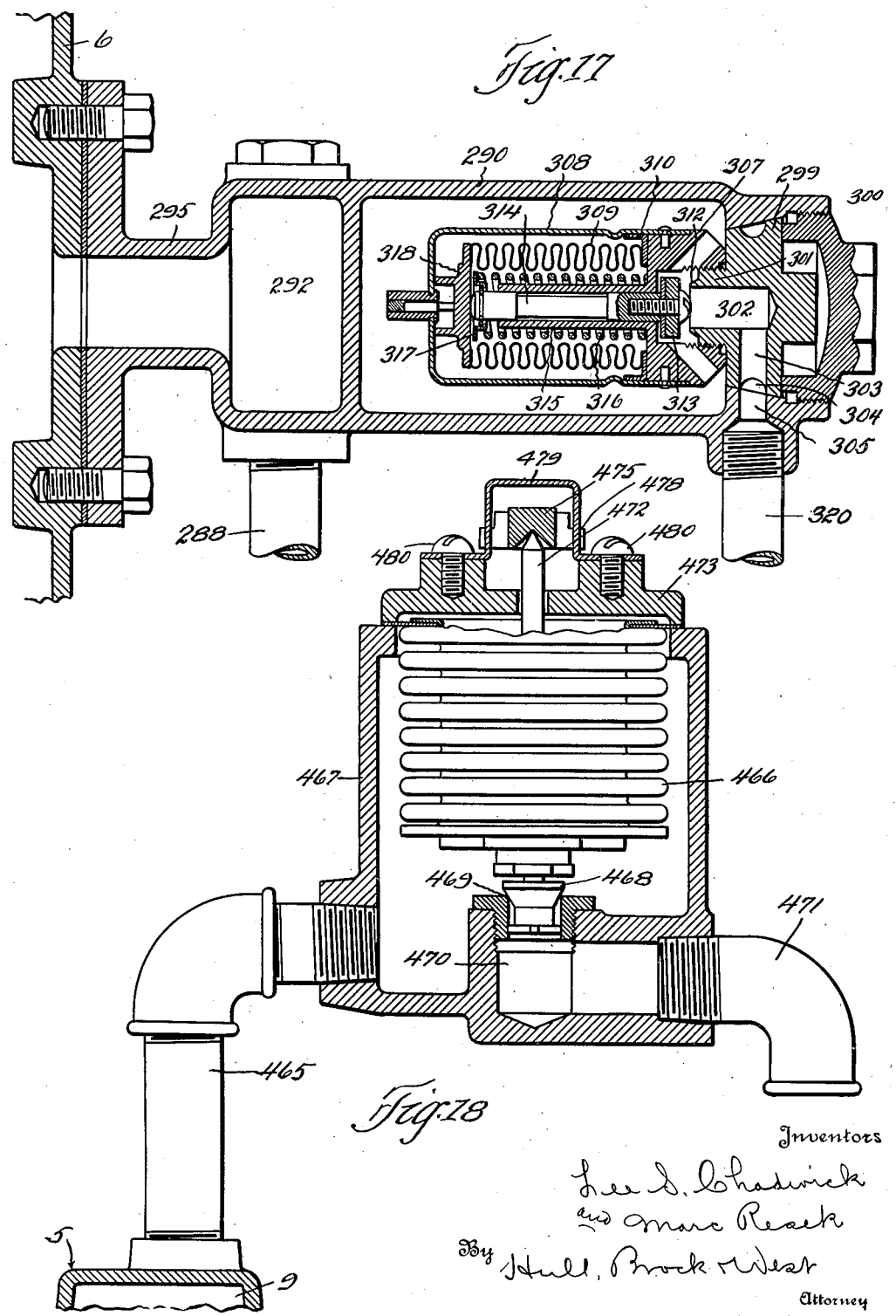

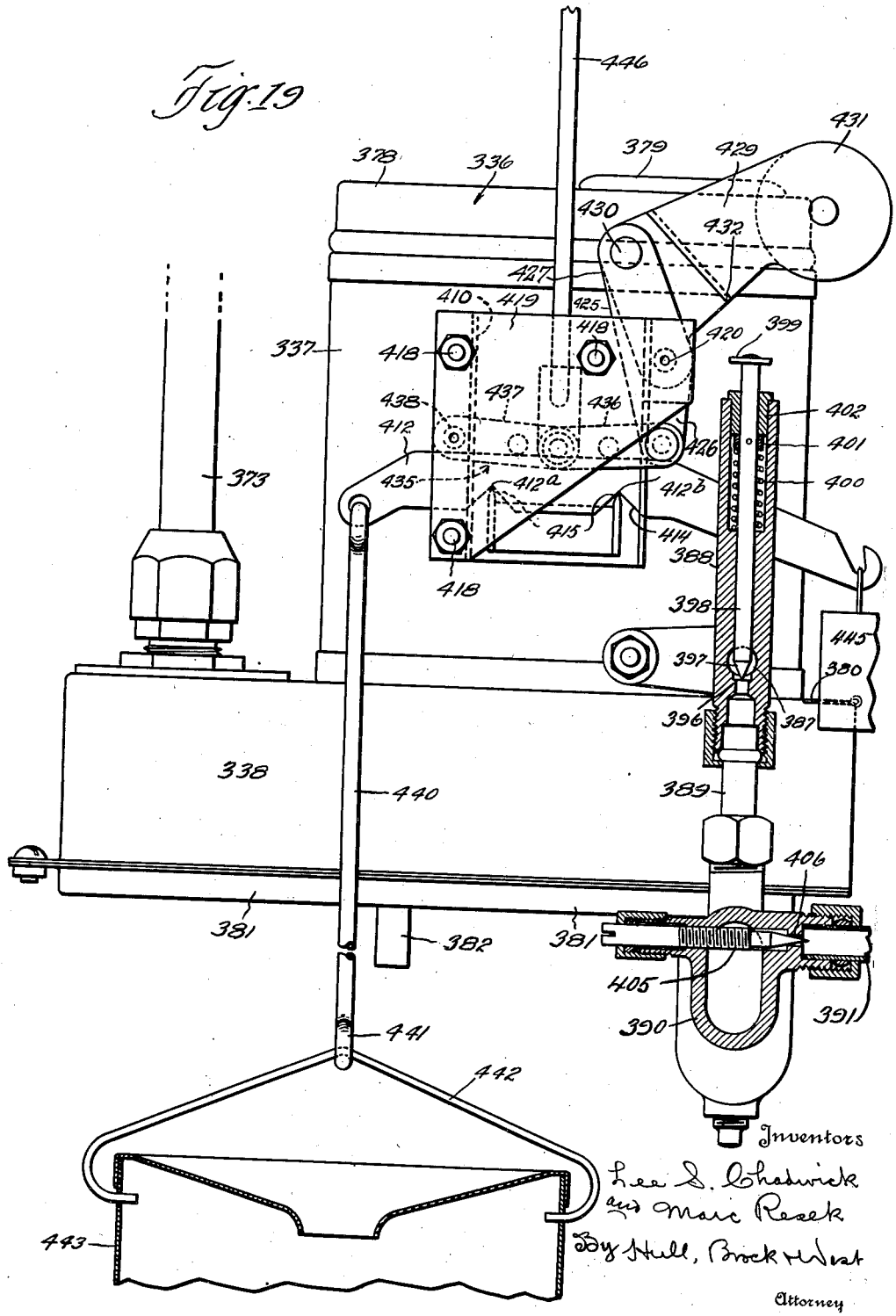

Aug. 16, 1932.    L. S. CHADWICK ET AL    1,871,951
FUEL OIL BURNING APPARATUS
Filed April 13, 1927    28 Sheets-Sheet 16
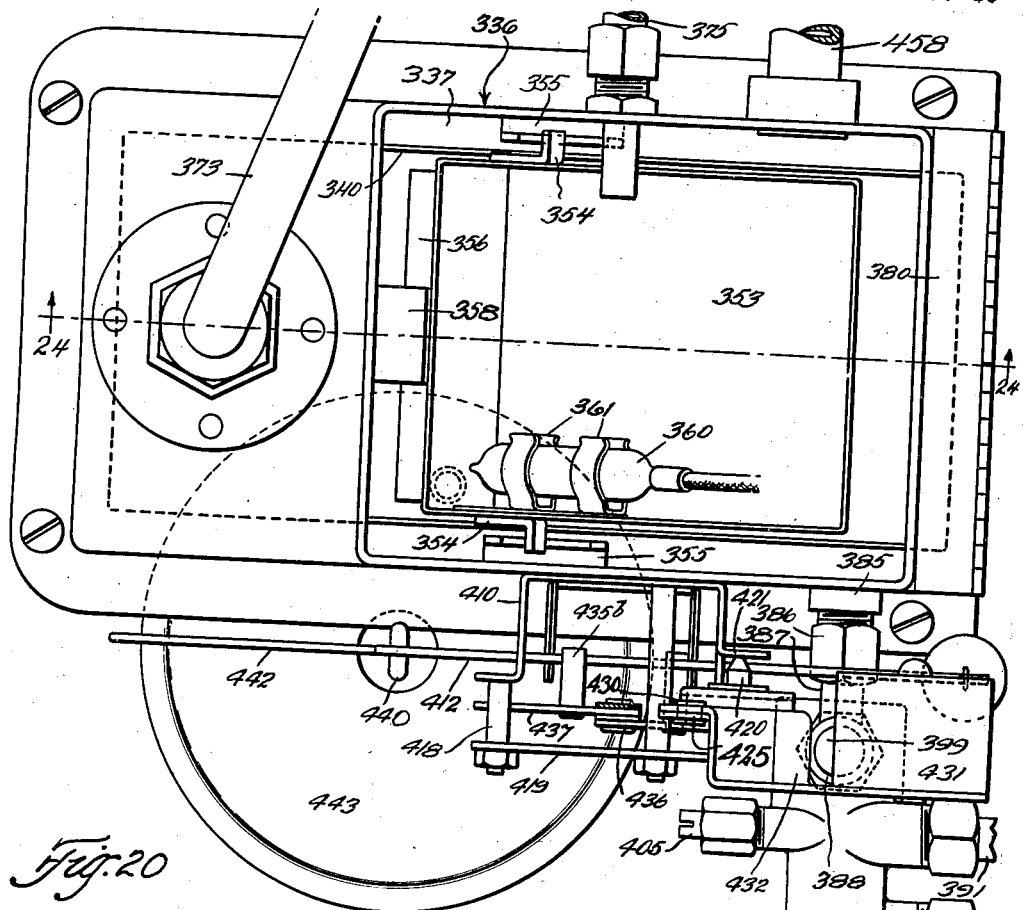
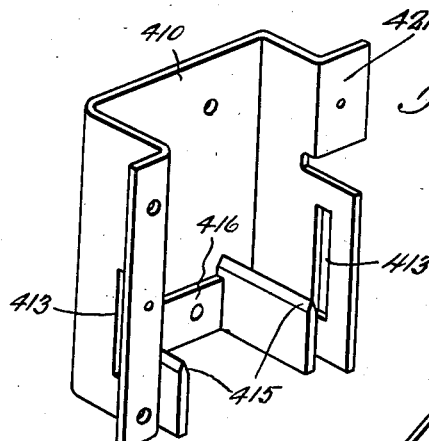
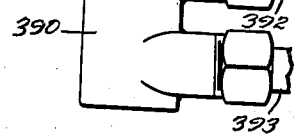
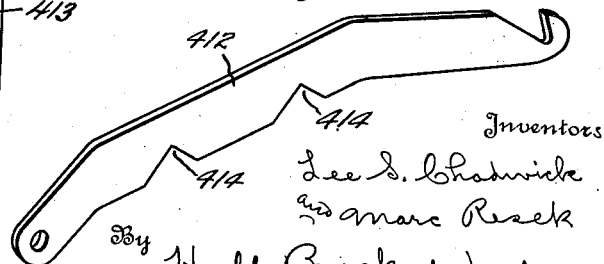
Inventors
Lee S. Chadwick
and Marc Resek
By Hull, Brock & West
Attorney

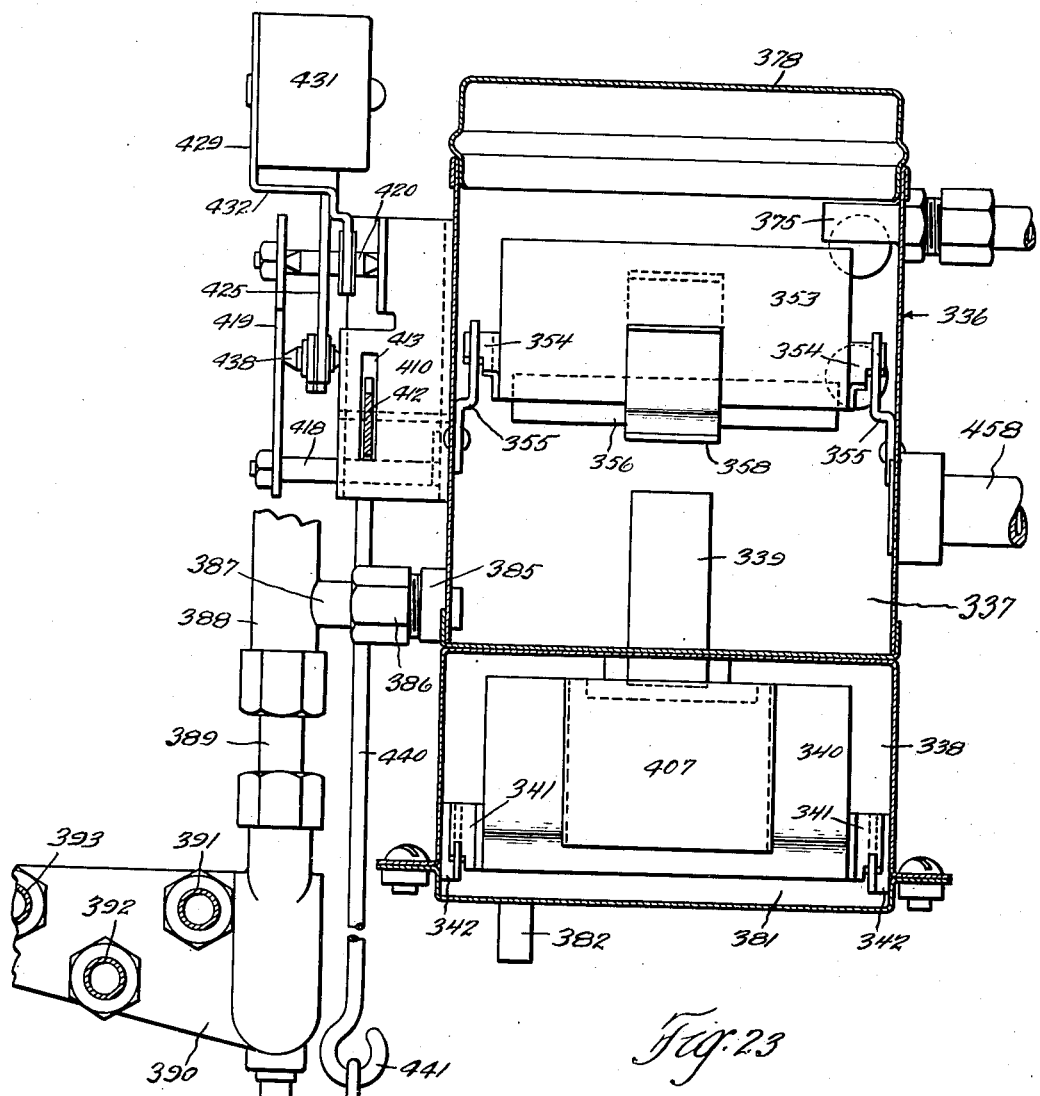

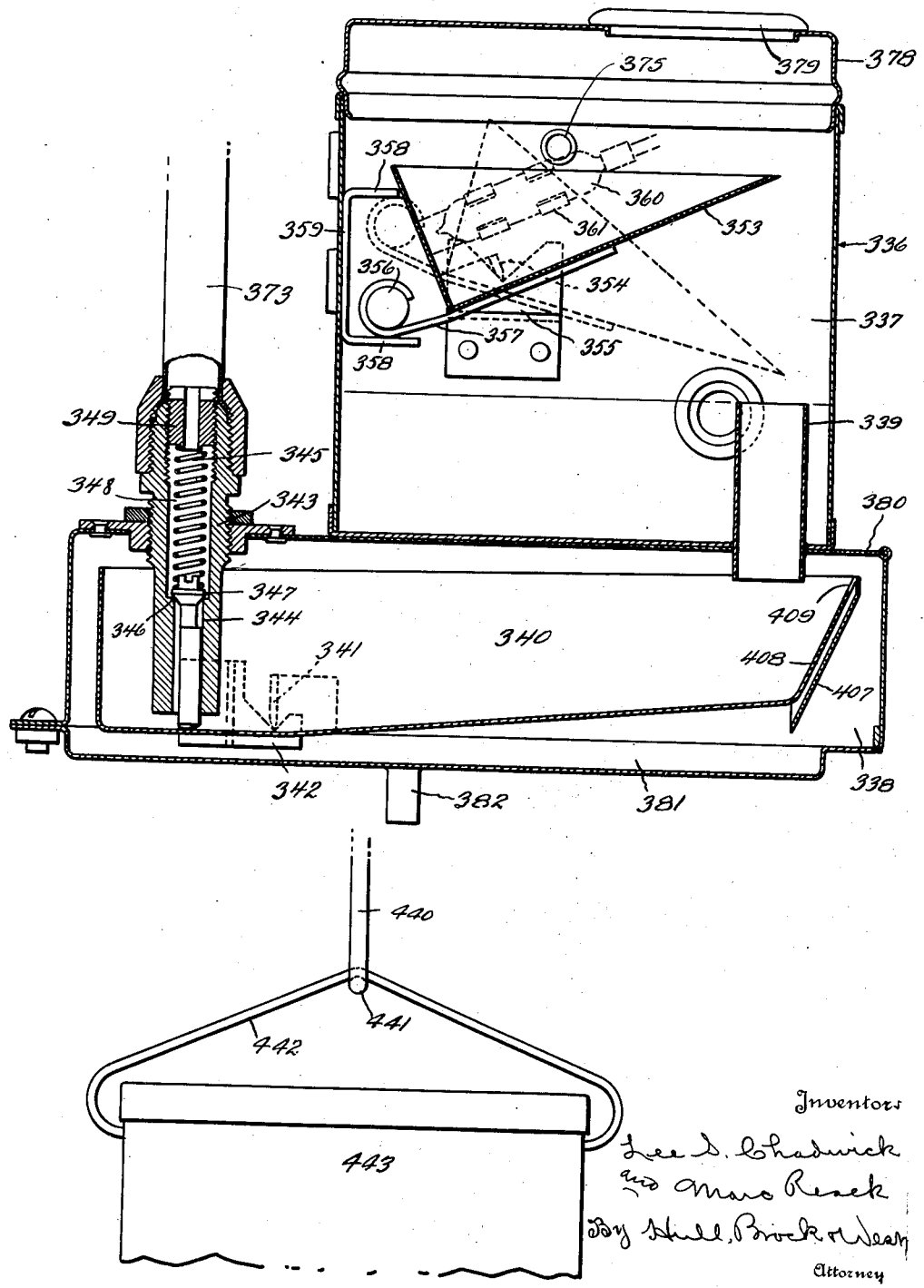

Aug. 16, 1932.  L. S. CHADWICK ET AL  1,871,951
FUEL OIL BURNING APPARATUS
Filed April 13, 1927   28 Sheets-Sheet 19
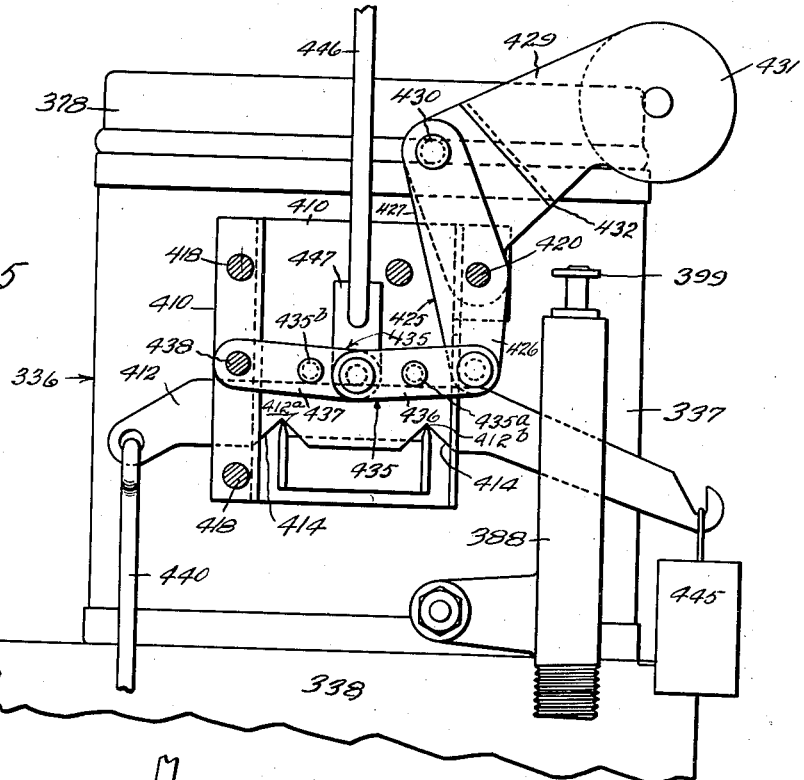
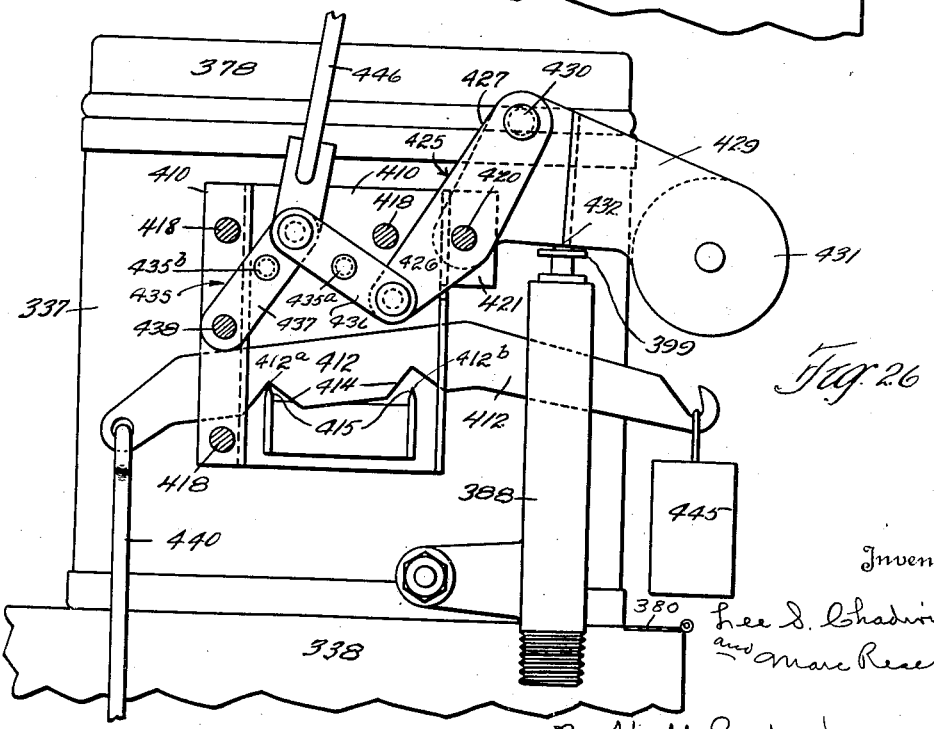

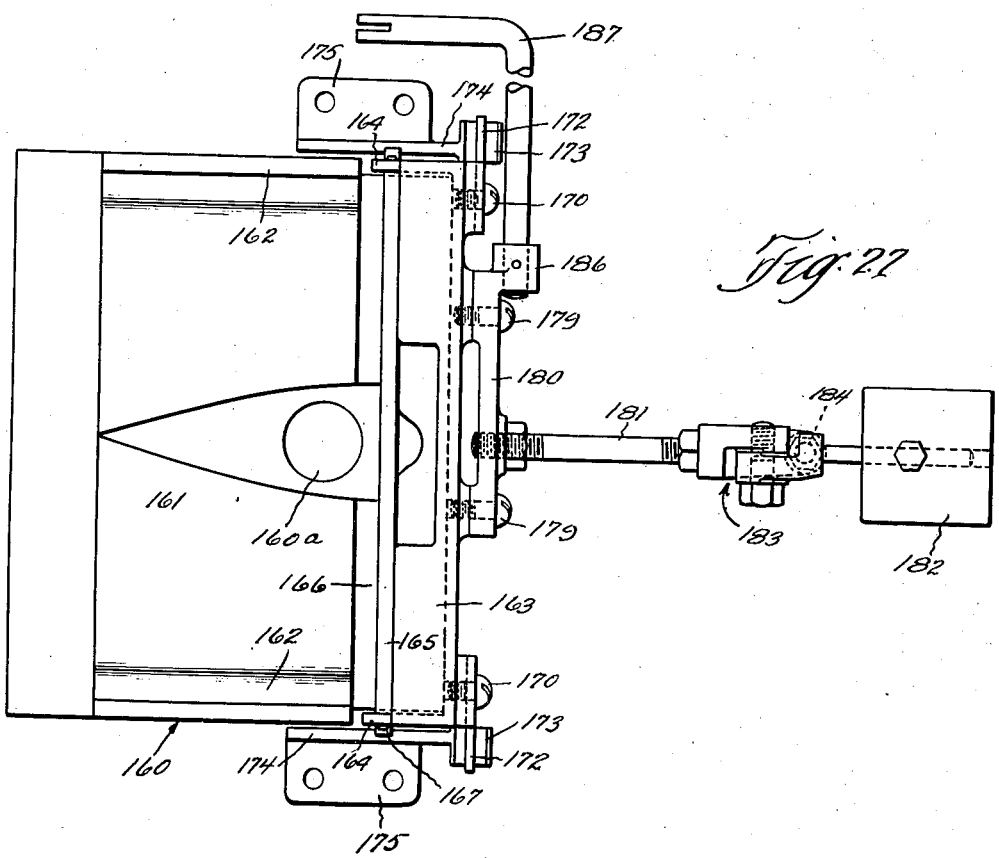
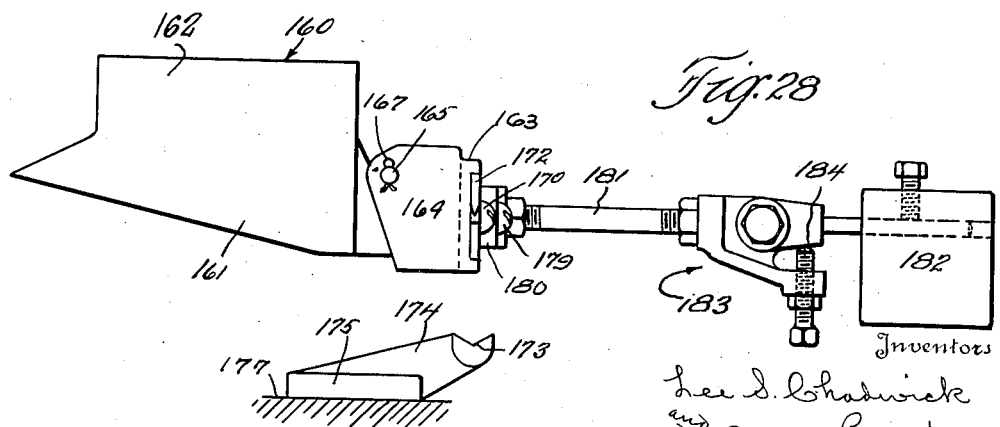

Aug. 16, 1932. L. S. CHADWICK ET AL 1,871,951
FUEL OIL BURNING APPARATUS
Filed April 13, 1927 28 Sheets-Sheet 21

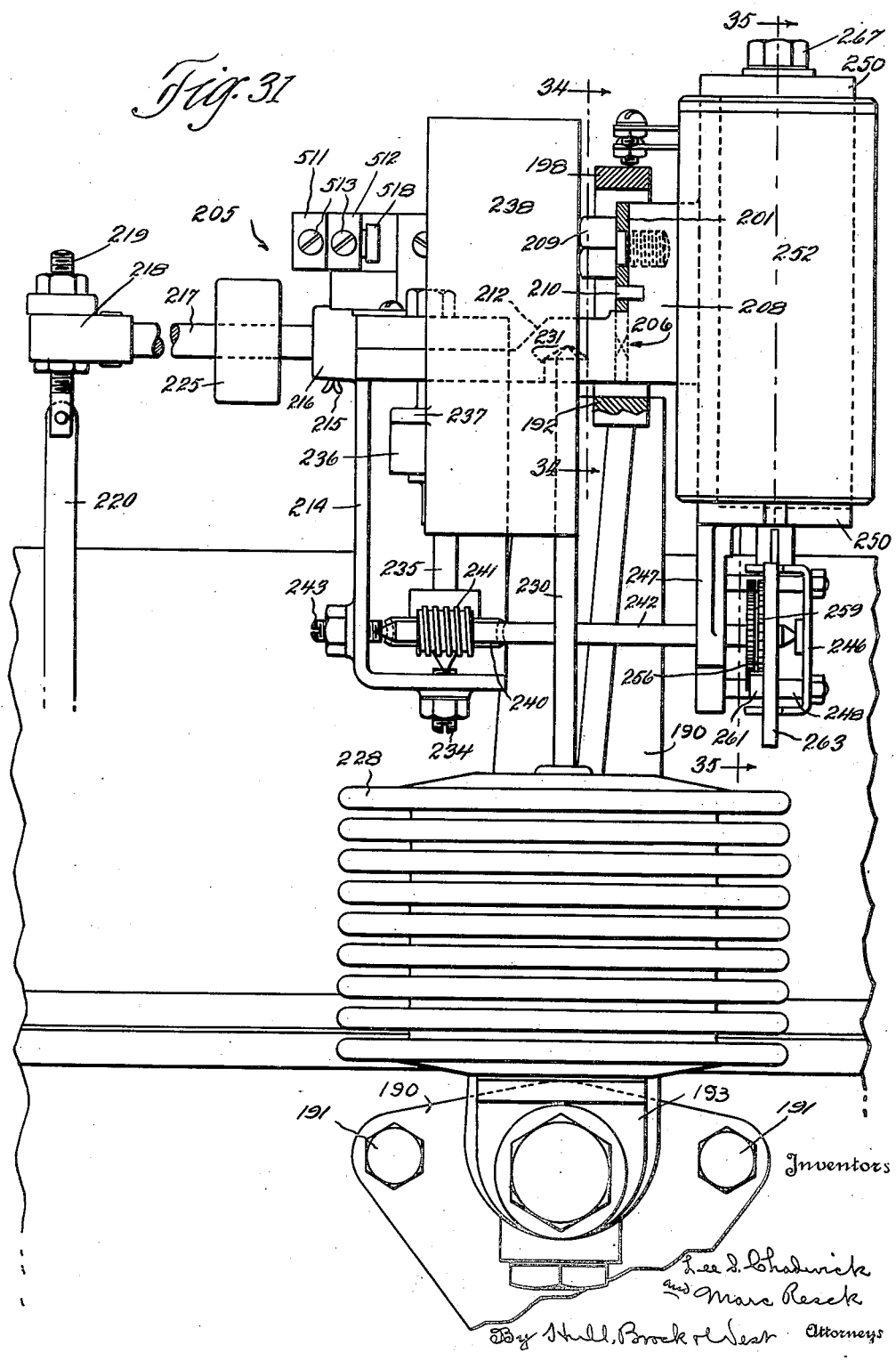

Aug. 16, 1922.    L. S. CHADWICK ET AL    1,871,951
FUEL OIL BURNING APPARATUS
Filed April 13, 1927    28 Sheets-Sheet 23

Inventors
Lee S. Chadwick
and Marc Recek
By Hull, Brock & West
Attys.

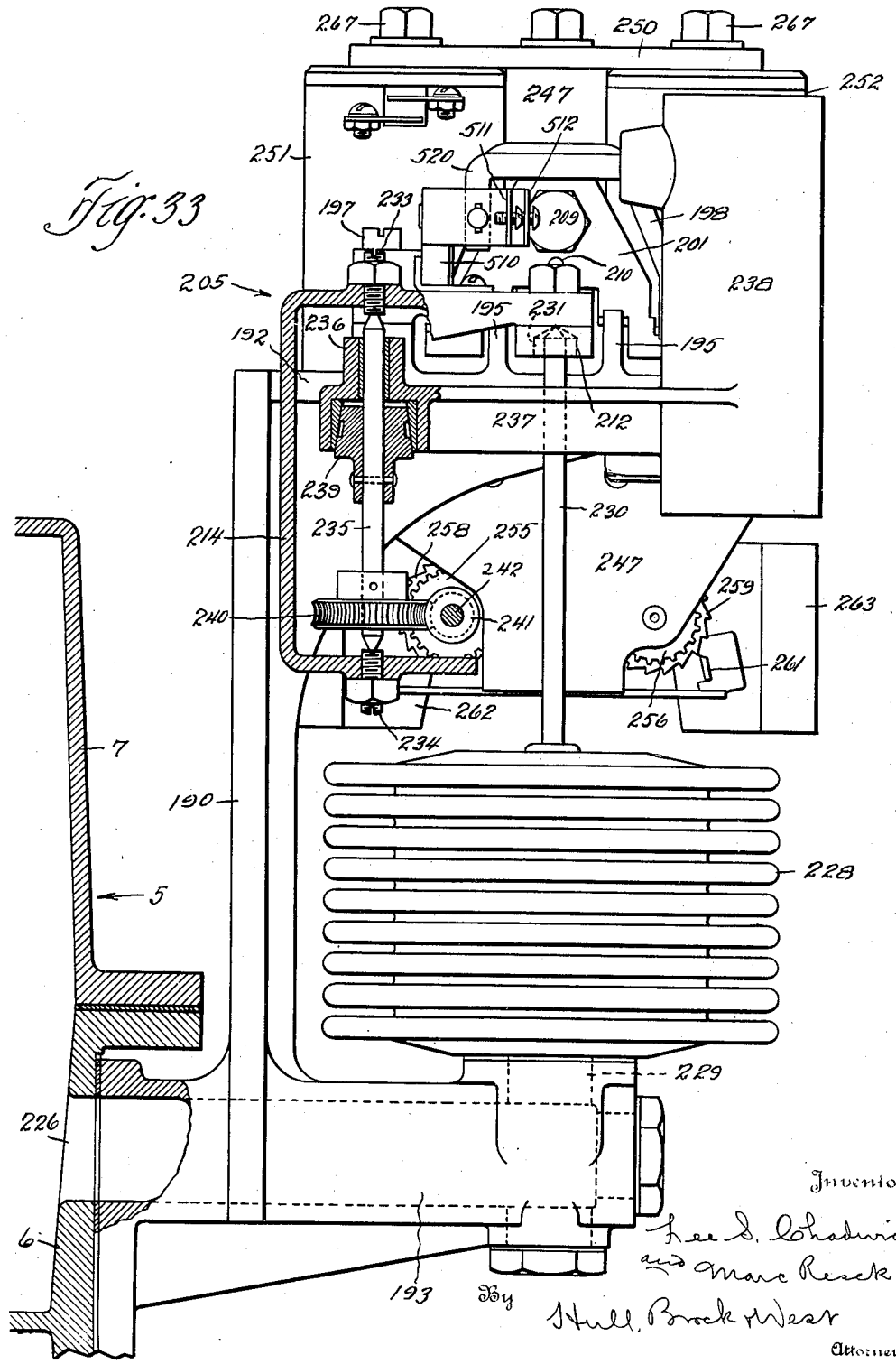

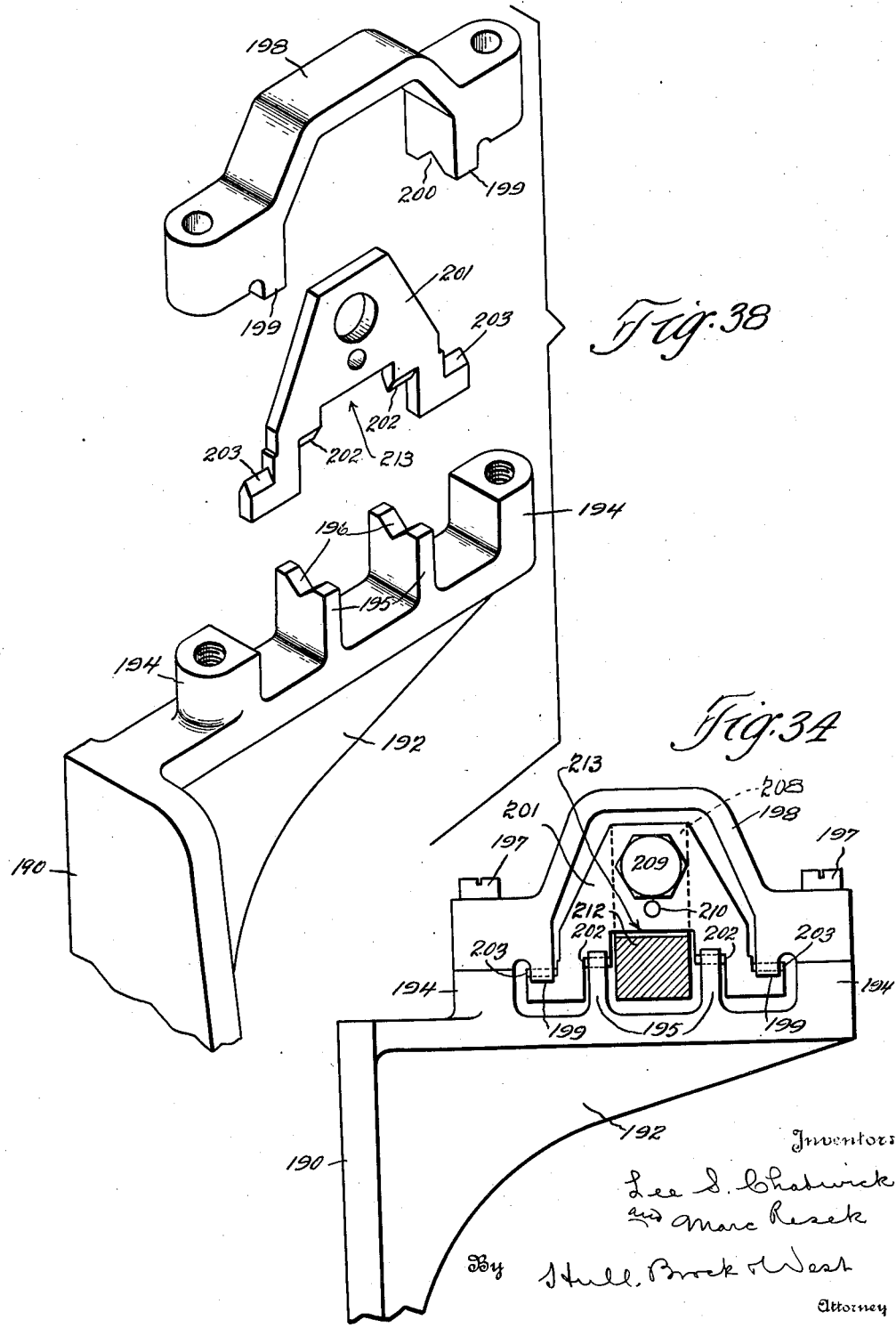

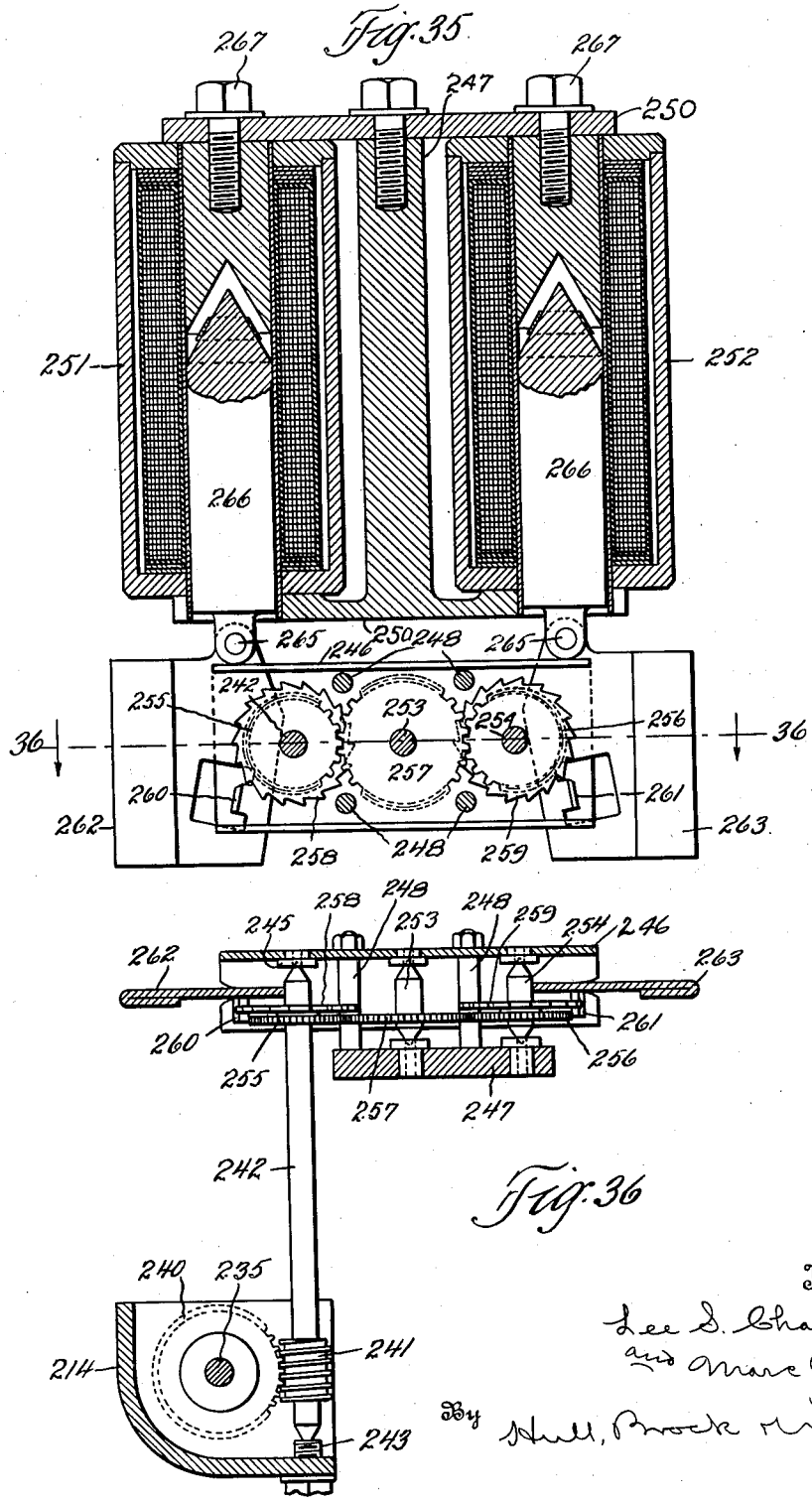

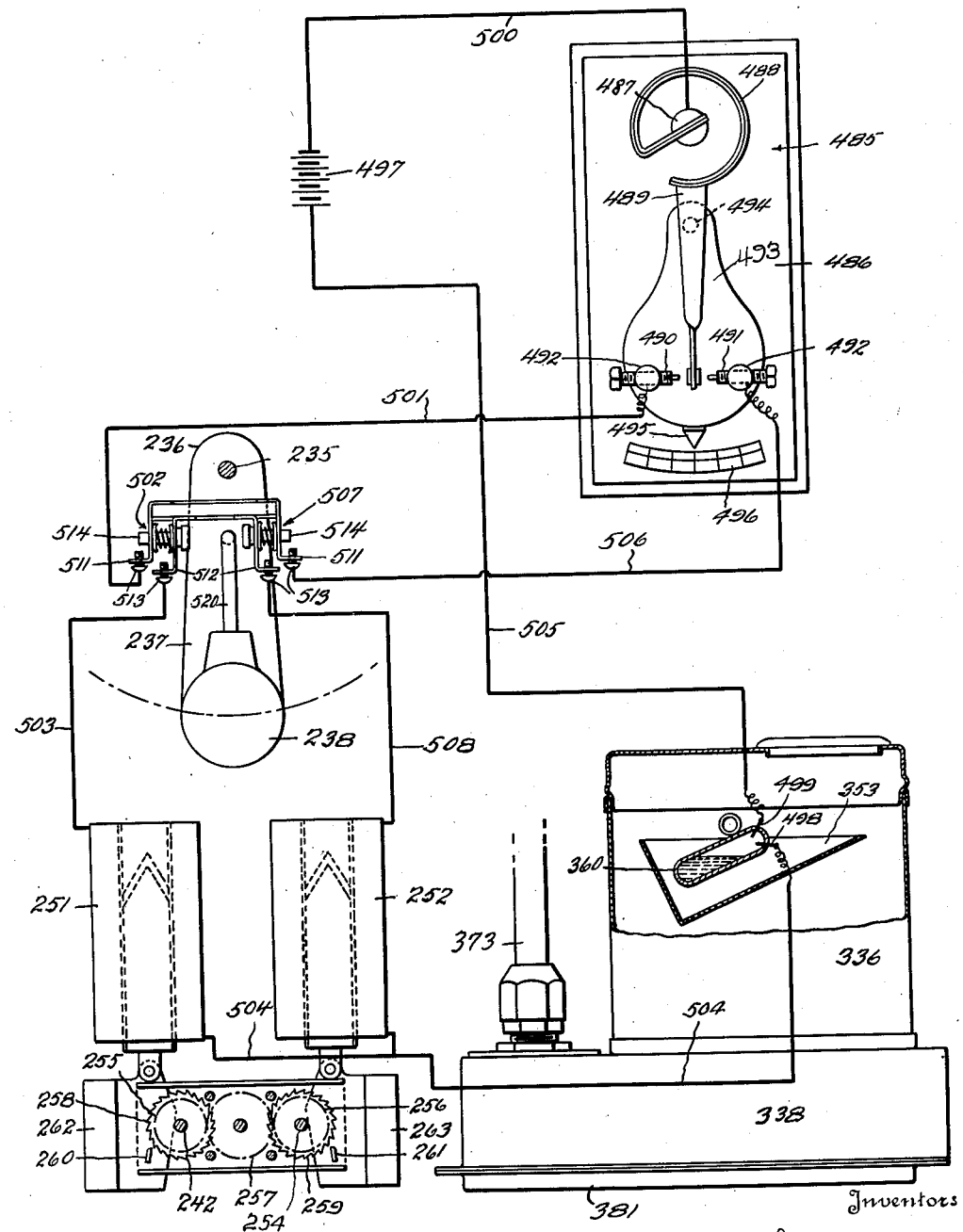

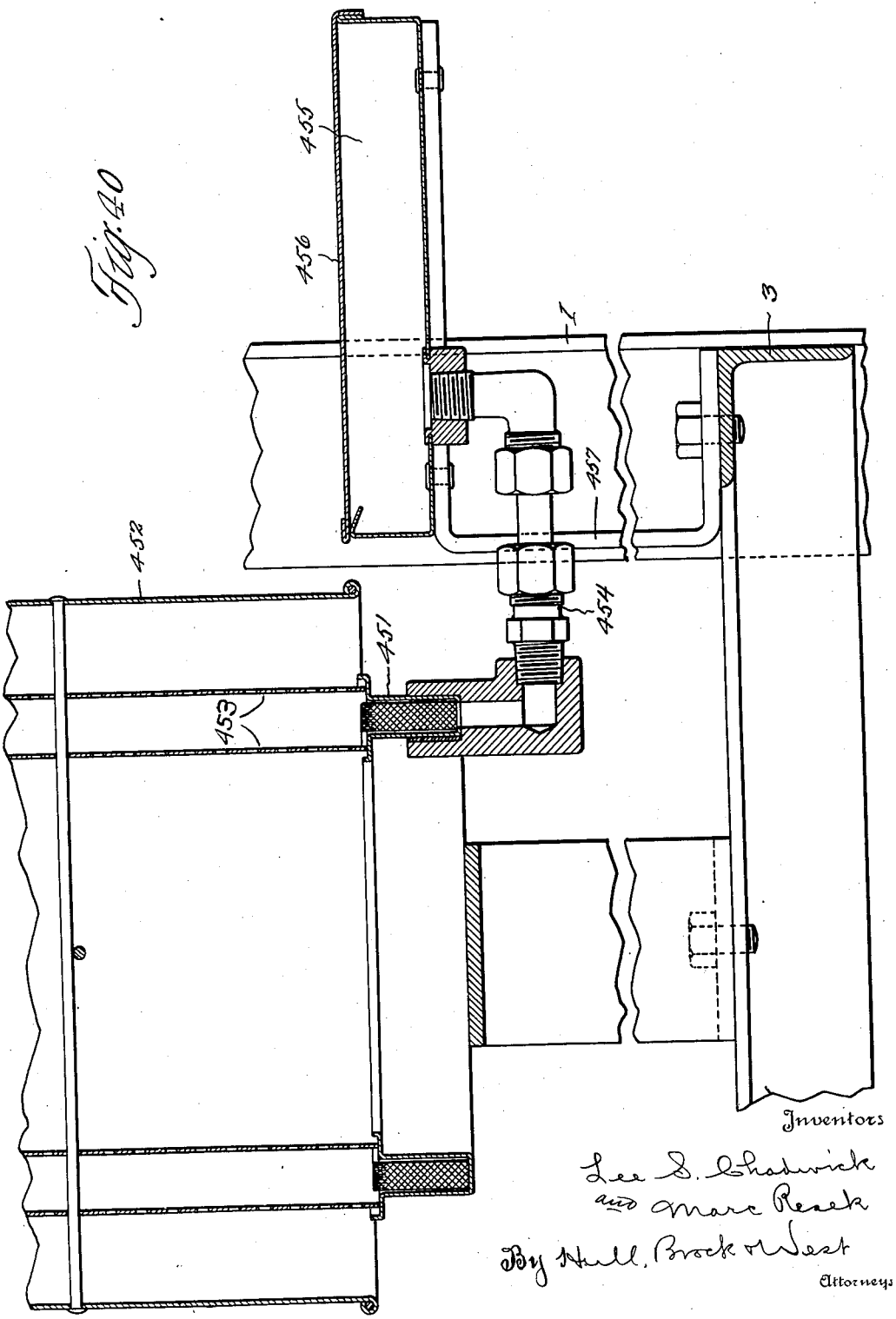

Patented Aug. 16, 1932

1,871,951

UNITED STATES PATENT OFFICE

LEE S. CHADWICK, OF SHAKER HEIGHTS, AND MARC RESEK, OF CLEVELAND HEIGHTS, OHIO, ASSIGNORS TO PERFECTION STOVE COMPANY, OF CLEVELAND, OHIO, A CORPORATION OF OHIO

FUEL OIL BURNING APPARATUS

Application filed April 13, 1927. Serial No. 183,411.

Our present invention relates to improvements in oil burning apparatus of the same general class as those disclosed in co-pending applications Serial No. 726,657, filed July 18, 1924; Serial No. 24,052, filed April 18, 1925; and Serial No. 139,877, filed October 6, 1926.

Apparatus of the class in question involve steam operated atomizing burners that are suitably supplied with fuel oil, and a steam generator or boiler that is subjected to the heat of the burner flames and from which the burners receive their steam supply, together with certain appurtenances which go to make up a practical and satisfactory oil burner that is substantially automatic in its operation.

While oil burning apparatus of this class are susceptible to a very wide range of utility, they are intended to be used more especially for firing hot air, hot water and steam furnaces in homes and other buildings and with no territorial restrictions. They may be used wherever oil and water are available.

The formation of scale in the boilers or generators of apparatus of the class to which the invention relates; and the lodging of particles of the scale and sediment from the boilers or generators in the relatively small steam emitting orifices of the burners, have been the sources of considerable annoyance and trouble, and have made necessary the use of water softening compounds and water straining or filtering means and all without a very marked degree of success.

It is the primary purpose of the present invention to provide oil burning apparatus of the class above referred to that is adapted for use with practically all kinds and conditions of water and which is practically immune from the troubles and difficulties above ascribed to its predecessors.

To this end we employ a steam generator of the evaporation type and direct the heat downwardly against, or across, the top of the generator so that in the creation of steam there is very little agitation of the water with a minimum of foaming and priming, and any sediment that is precipitated within the generator will be concentrated in the bottom portion thereof where it will not impede the transmission of heat to the water nor be carried off, to any material degree, with the steam. Furthermore, because of the fact that the lower portion or bottom wall of the generator is not subjected to intense or direct heat, the sediment does not form into a scale and bake on the bottom wall, but merely settles thereon in the form of a thick loose mud that is readily removable.

It is a further object to enhance the transmission of heat to the water in generators of the character referred to, and to the attainment of this we provide a series of pins which depend from the top of the generator and project into the water, and these pins are preferably made smooth and tapering so that any scale which forms about them will crack and drop off by reason of the expansion and contraction of the pins resulting from the alternate heating and cooling of the generator through the customary use of the apparatus. Also, the presence of these pins prevents undue heating of the top of the generator.

To further increase the efficiency of the heat absorption and transmission we preferably incorporate heat abstracting spuds which are desirably located directly above and constitute, in effect, continuations of the before mentioned pins.

Objects additional to those above mentioned are to generally improve oil burning apparatus of the class referred to; to provide an efficient water feed, water pre-heater, and water level control means for the steam generator; to provide efficient oil filtering, oil feeding, and control means for the burners; to provide a safety appliance that will operate automatically to shut off the oil supply to the burners in case the normal oil circulation through the system is interrupted, or in case the apparatus becomes overheated, or that may be operated manually from a remote point; and, broadly, to provide a highly satisfactory and thoroughly reliable oil burning apparatus that is automatic of operation and practically immune from disorder.

*Drawings*

An embodiment of the invention through which the foregoing objects, with others which will hereinafter appear, are attained, is illustrated in the accompanying drawings wherein Fig. 1 is a front elevation. Fig. 2 a left hand side elevation, Fig. 3 a right hand side elevation, and Fig. 4 a plan view of our improved oil burning apparatus; Fig. 5 is a horizontal section through the apparatus below the steam generator, as indicated by the line 5—5 of Fig. 1; Fig. 6 is a detail elevational view of the water pre-heater; Fig. 7 is a fragmentary front elevation of the apparatus on a scale somewhat enlarged over that of the preceding views and shows particularly the steam generator and parts associated therewith; Fig. 8 is a plan view of the steam generator as it would appear with the refractory walls of the combustion chamber removed; Fig. 9 is a central longitudinal section through the generator and parts associated with it, as indicated by the line 9—9 of Fig. 8, the walls of the combustion chamber being included in the present view; Fig. 10 is a longitudinal section through one side of the steam generator, as indicated by the line 10—10 of Fig. 8; Fig. 11 is a vertical transverse section through the generator, on the line 11—11 of Fig. 9, and looking forwardly, as indicated by the arrows associated with said line, one side of the combustion chamber being omitted for clearness; Fig. 12 is a sectional front elevation of the generator, the plane of section being indicated by the line 12—12 of Fig. 9; Fig. 13 is a section on an enlarged scale through one of the auxiliary burners and its steam operated control valve, the section being taken on the line 13—13 of Fig. 7; Fig. 14 is a sectional detail on the correspondingly numbered line of Fig. 13; Fig. 15 is a vertical section through the water level control housing and the adjacent portion of the steam generator wherewith it communicates; Fig. 16 is a sectional detail on the line 16—16 of Fig. 15; Fig. 17 is a horizontal section on the correspondingly numbered line of Fig. 15; Fig. 18 is a sectional detail of the safety valve which determines the maximum steam pressure of the generator; Fig. 19 is an enlarged front elevation, and Fig. 20, a plan view with the cover removed, of the oil control housing and the safety appliance associated therewith; Figs. 21 and 22 are perspective views of the supporting bracket and operating lever, respectively, of the safety appliance; Fig. 23 is a sectional right hand elevation of the oil control housing and safety appliance; Fig. 24 is a section through the oil control housing on the line 24—24 of Fig. 20; Figs. 25 and 26 are details of the safety appliance, the former view showing it "set", or in normal position, and the latter view showing it tripped by the weight of an accumulation of oil in the drip pail or receiver; Fig. 27 is a plan view of the damper unit showing it as resting through its knife edge bearings on its sustaining brackets; Fig. 28 is a side view of the damper unit showing it as though lifted from its brackets; Fig. 29 is a fragmentary front elevation of the steam generator with the damper unit in place, parts being broken away to reveal certain structural features; Fig. 30 is a central vertical section, from front to rear, through the damper unit; Fig. 31 is an enlarged sectional side elevation of the damper control mechanism, showing it as viewed in Fig. 3; Fig. 32 is a plan, and Fig. 33 a front elevation, of said mechanism; Fig. 34 is a transverse section on the line 34—34 of Fig. 31; Fig. 35 is a section on the line 35—35 of Fig. 31; Fig. 36 is a sectional detail on the correspondingly numbered line of Fig. 35; Fig. 37 (sheet 23) is an enlarged sectional plan view of the circuit breakers incorporated in the damper control mechanism; Fig. 38 (sheet 25) is a perspective view of the parts of a double knife edge bearing included in the damper control mechanism, the parts being shown separated in the present view, and assembled in Fig. 34; Fig. 39 is a wiring diagram of the circuit through which the magnetic means of the damper control mechanism is governed by the room thermostat; and Fig. 40 is a detail of the starting burner.

*General description*

The apparatus comprises, generally, a stand on which is mounted a steam generator, and superimposed upon the generator is a housing, preferably of suitable refractory material, that encloses a main and an auxiliary combustion chamber. Burners of the injector type are arranged to discharge their products into the housing, and a damper that is movably sustained at a point of communication between the two chambers determines by its position what proportion, if any, of the products of combustion shall pass through the auxiliary combustion chamber. It may be explained that the bottom wall of this auxiliary combustion chamber is constituted of the top wall of the steam generator and, as will hereinafter be more specifically described, pins depend from the top wall of the generator for conducting the heat from said wall to the water in the generator, and spuds rise from the generator and intercept, to a certain degree, the passage of heat through the auxiliary combustion chamber and consequently abstract therefrom heat that would otherwise escape.

Other units supported by the stand are the float tank of the water supply; a water filter or separator; a pump involving individual pumping chambers for the water and for the oil, respectively; a so-called heat interchange or water pre-heater for heating the water before it is delivered to the generator; an oil strainer; an oil control housing, and a starting burner, with its oil supply tank, for preheating the generator.

Conduits conduct the steam from the generator to the burners, and those leading to the auxiliary burners include valves that are controlled by pressure actuated means that are subjected to the steam pressure within the generator and oil is supplied to the burners from the oil control housing.

When the previously mentioned damper is in a position to divert the products of combustion through the main combustion chamber it thus protects the steam generator from the heat of said products, wherefore this position of the damper will be referred to as generator-shielding position. A weight of variable influence tends to move the damper from generator-shielding position, and pressure operated means that is subjected to the steam pressure in the generator acts to move the damper in opposition to said weight so that as the steam pressure rises within the generator the damper is moved toward generator-shielding position.

The apparatus, in the nature of a self-contained unitary structure composed of the foregoing and subordinate elements, is of a size and design adapting it to be conveniently located in front of a furnace in a position to discharge its products, through preferably a common outlet from its main and auxiliary combustion chambers, into the fire box of the furnace, desirably through the usual feed door thereof. As in the apparatus which form the subject matter of the above mentioned application, we employ in the present case electro-magnetic means for varying the influence of the aforesaid weight on the damper, and the action of said means is controlled by a thermostat that is located in the room, compartment or apartment, that is heated, through the intervention of the heating plant or furnace, by the apparatus.

*Detailed description: stand*

Figure 1:
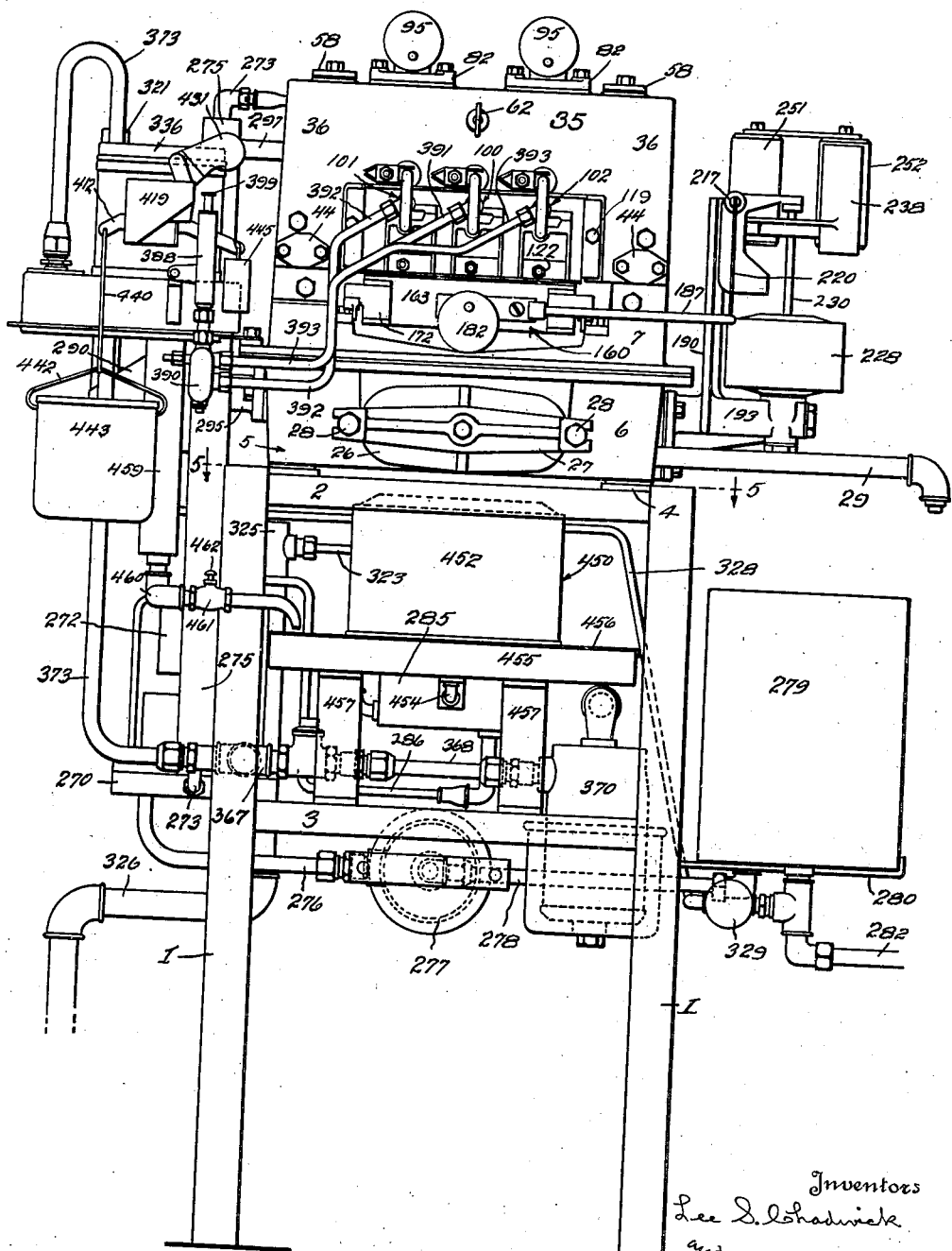
Figures 13, 14:
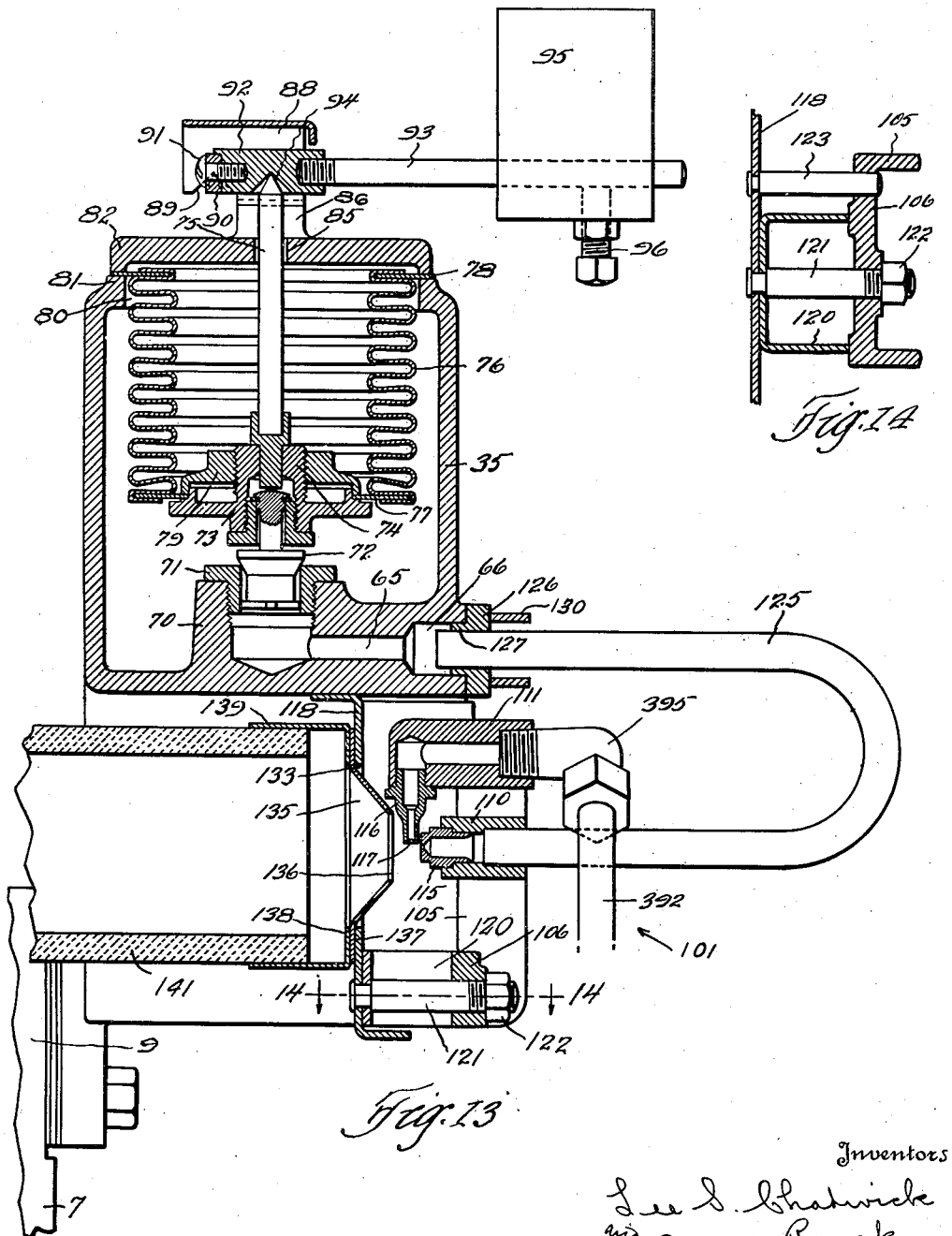
Figure 29:
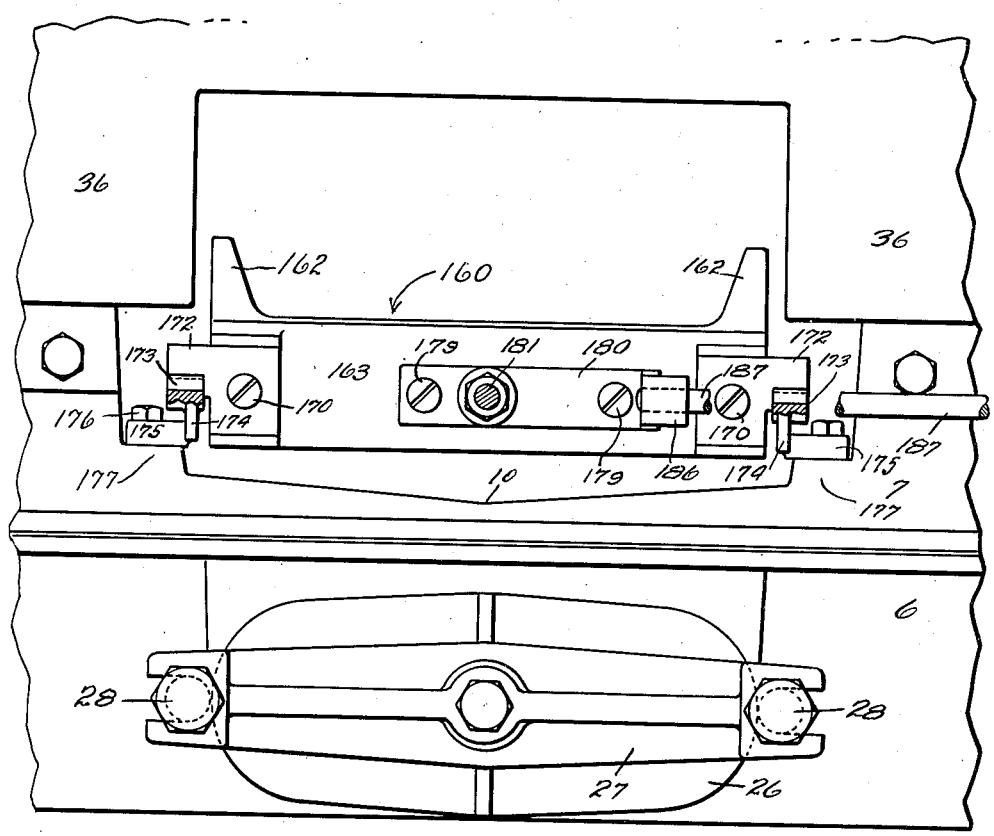
Figure 30:
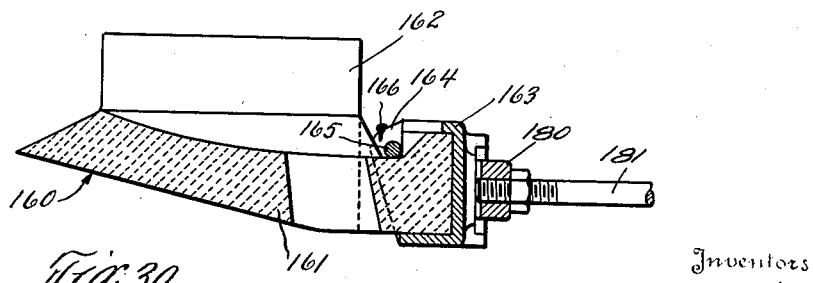
Figure 37:
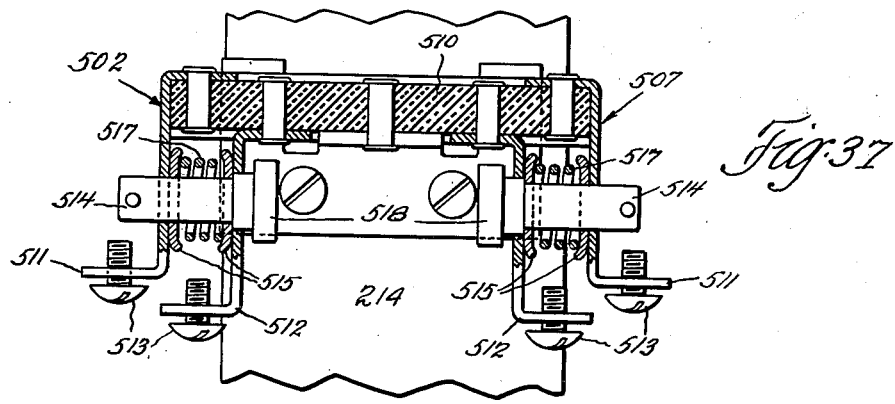
Figure 32:
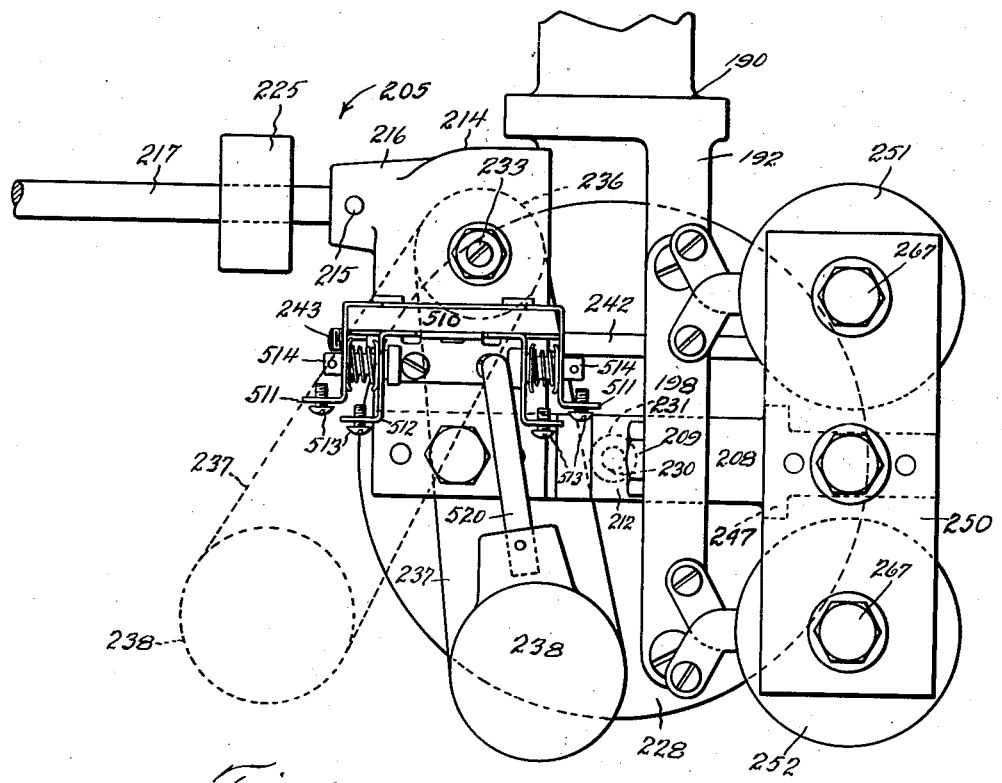

(Reference numerals 1 to 4) (Figs. 1 to 5, 7, 9 to 12)

The stand, according to the present embodiment, is composed of legs 1 that are connected together at their upper ends by a rectangular frame 2, and intermediate their ends by a similar frame 3, the legs 1 being in the nature of angle irons and constituting the corners of the stand. It will be noted also that the frames 2 and 3 are constructed of angle irons. Suitably secured to each corner of the top of the stand is a plate 4.

*Steam generator*

(Reference numerals 5 to 96) (Figs. 1 to 4, 7 to 13)

Surmounting the stand is the steam generator that is designated generally by the reference numeral 5. This generator is made up of a lower pan-like section 6 and an upper section 7. As will be seen most clearly from Figs. 7 to 12, the upper section 7 is formed with elevated portions extending along each of its sides, and these constitute steam domes that are designated 9; and the top wall 10 of the generator extends inwardly and downwardly from the inner walls 11 of the steam domes. The sections 6 and 7 have peripheral flanges 12 that are clamped together, with a gasket 13 of suitable packing material compressed between them, by bolts 14. Cap screws 18, that are inserted upwardly through apertures in the plates 4, are threaded into the corners of the section 6 and serve to secure the generator to the stand.

By forming the generator sections 6 and 7 with mating necks 19 and 20, respectively, a flue 21 is provided through the generator for the passage of the products of combustion from a starting burner, as will hereinafter more fully appear. The necks 19 and 20 are secured together, with a washer 23 compressed between them, by scrws 24. The lower section 6 is provided with a clean-cut opening 25 in its front wall that is closed by a cover 26 to which a yoke 27 is attached; and screws 28 are engaged through the notched ends of the yoke 27 and are threaded into the front wall of the generator section 6 for binding the cover in place. A drain is also provided for the generator which, in the present instance, is formed of a pipe 29 that is tapped into the right hand side of the section 6 adjacent its forward end and terminates in an ell that is normally closed by a plug. The top wall 10 of the generator is provided with a multitude of frusto-conical bosses 30 which terminate at their upper ends in heat abstracting spuds 31. Screwed upwardly into tapped holes that are formed in the bosses 30 on the under side of the top wall 10 are pins 33. These pins are preferably made smooth and tapering for a reason which we will presently explain and because of their relation to the spuds 31 constitute, in effect, continuations thereof.

Disposed like an arch across the front end of the generator 5 is a steam box 35 that is rectangular in plan and has depending legs 36 at its opposite ends whose lower ends overlap the upper front corners of the steam domes 9. The steam box is secured to the generator by screws 38 that pass through apertures in lugs 39 that are formed on the lower ends of the legs 36 and are screwed into the adjacent portion of the generator, and by screws 40 that are extended entirely through the legs 36 and have their rear ends threaded into tapped apertures in lugs 41 which rise from the forward ends of the steam domes 9. (Fig. 10.) Fastened by screws 43 to the lower front sides of the legs 36, so that they may be readily removed for cleaning, are sediment traps 44 whose chambers 45 communicate with the lower ends of said legs through openings 46. Clamped, with suitable gaskets applied to their opposite sides, between the rear sides of the legs 36 and the adjacent portions of the steam domes 9, are plates 48; and tubes 49 are supported by and extend through the said plates. Into the forward ends of the tubes 49 are fitted tapering or Venturi tubes 50 whose forward ends project into the chambers 45 of the sediment traps 44. The adjacent walls of the steam box and generator have relatively large openings 51 and 52, respectively, (Figs. 11 and 12) for the accommodation of the tubes 49; and gaskets of suitable material are interposed between the sediment traps 44 and the legs 36 of the steam box to effect fluid tight joints at these places. The interiors of the extreme lower ends of the legs 36, which communicate, through the openings 46 (Fig. 10), with the chambers 45 of the sediment traps, are separated from the major portion of the interior of the steam box by horizontal walls 53 which have apertures 54 that are surrounded by seats 55. Strainers 56, in the nature of sleeves of foraminous material, such as wire screen of suitable mesh, have their lower ends engaged with the seats 55 and their upper ends disposed within apertures in the top wall of the steam box 35, said apertures being fitted with closures 58 that are secured in place by screws 59. By reason of this arrangement, the strainers may be easily removed for cleaning or replacement.

The atomizing burners receive their steam supply from the steam box 35. According to our present construction there are three such burners, one being located in substantially the vertical central plane of the apparatus and known as the main burner, and one spaced laterally in each direction therefrom and known as an auxiliary burner. A port 60 (Fig. 9) is formed in the front wall of the steam box midway between its ends and the same is controlled by a valve 61 whose operating handle is designated 62. Steam is supplied through this port to the main burner, as will hereinafter be more fully described, and ports 65 are formed in the lower front portions of the steam box (Fig. 13) for supplying steam to the auxiliary burners. The outer ends of the ports 60 and 65 are enlarged to form sockets 66. The valve 61 which controls the passage of steam through the port 60 to the main burner is adapted to be manually operated, while valves for controlling the passage of steam through the ports 65 to the auxiliary burners are operated by steam pressure, as we shall now describe, reference being had particularly to Figs. 12 and 13.

The inner ends of the ports 65 open into internally threaded hollow bosses 70 into which are screwed thimbles 71 whose upper ends constitute seats for valves 72 that are guided within the bores of the thimbles and have a relatively loose connection with flanged members 73 to the threaded hubs 74 of which are suitably connected the lower ends of pins 75. Metallic diaphragms or bellows 76 have their lower ends crimped about the outer peripheries of annuli 77, and their upper ends similarly formed about the inner peripheries of annuli 78, the joints between the bellows and said annuli being soldered or otherwise treated to render them fluid tight. Clamping rings 79 have their internally threaded hubs screwed upon the hubs 74 of the members 73, and clamped between their outer depending edge portions and the opposed portions of the members 73 are the inner peripheries of the annuli 77.

The top wall of the steam box 35 has openings 80 through which the bellows 76 are adapted to be inserted, and the outer edge portions of the annuli 78 rest upon raised seats 81 that surround said openings and between which, and the peripheries of covers 82, the edge portions of said annuli are adapted to be firmly clamped when the covers are drawn down tightly by means of screws 83 (Fig. 11). The covers 82 have central apertures 85 through which the pins 75 loosely pass, and bosses 86 rise from the covers 82 on opposite sides of said apertures. To these bosses are secured, as by screws 87, the opposed base flanges of pressed metal hoods 88, and formed in the lower edges of the opposed walls of said hoods are inverted V notches 89. Engaged within these notches are knife edge bearings 90 that are secured by screws 91 to the heads 92 of weight arms 93, said heads, in turn, having conical recesses 94 within which engage the pointed upper ends of the pins 75. Thus very sensitive pivotal connections are effected between the pins 75 and the weight arms, and between said arms and the hoods 88. Weights 95 are adjustable on the arms 93 and are adapted to be secured in any desired position thereon by means of set screws 96.

Burners (Reference numerals 100 to 142) (Figs. 1 to 4, 7 to 9, 13, 14)

The central and main burner is designated, generally, 100, and the two auxiliary burners are similarly designated 101 and 102, respectively. The three burners are identical so that a description of one will suffice for all. Referring particularly to Figs. 7, 13 and 14, 105 is a burner frame which involves at its lower end a cross member 106, and at its upper end, cross members 107 and 108, the latter being preferably formed separate from the remaining portion of the frame and secured thereto by suitable means. The cross members 107 and 108 incorporate hollow bosses 110 and 111, respectively, each of which has a through passageway, that of the latter (see Fig. 13) being angular and opening downwardly at its inner end beyond the vertical plane of the corresponding end of the boss 110. Fitted into the inner end of the boss 110 is a steam nozzle 115 that is provided with a relatively small steam emitting opening which, as shown best in Fig. 11, is elongated and has its longer axis disposed horizontally. An oil nozzle 116 is screwed or otherwise secured within the inner end of the boss 111 and depends slightly to the rear of the steam nozzle 115 with its jet orifice 117 in operative relation to the steam emitting orifice of the nozzle 115.

It has been found by experience in connection with the apparatus disclosed in the previously mentioned co-pending applications, where the oil nozzles are inverted with respect to the one just described, that occasionally when the burners are shut off there is a slight deposit of oil left on the nozzle which congeals and closes or restricts the jet orifice and causes a sputtering of the flame when the burner is again ignited. By arranging the oil nozzle as herein shown, this difficulty is entirely eliminated because any oil left within or upon the nozzle when the burner is shut off will immediately drop therefrom.

The burner frames 105 are supported by a plate 118 that closes the arch of the steam box 35 between the depending legs 36 thereof, the ends of said plate being secured by screws 119 to the adjacent portions of said legs. For each of the burners the plate 118 is provided with a U-shaped support 120 that is shown as secured to said plate by the rivet-like inner end of a stud 121 that extends forwardly, centrally of the member 120, and has its outer end projected through an opening in the cross member 106 of the corresponding burner flame beyond which it is equipped with a nut 122. By means of the nut the burner frame may be securely clamped against the outer ends of the support 120, and the frame 105 is properly positioned by means of a dowel 123 that extends forwardly from the plate 118 and has its outer end engaged within an opening in the cross member 106. A conduit 125 conveys the steam to the burner and the same is in the nature of a U-shaped tube or goose neck. Its outlet end is permanently fitted within the outer end of the bore of the boss 110, while its opposite end is provided with a collar 126 having a neck 127 that fits within the socket 66 that constitutes the outlet end of the port through which the corresponding burner is supplied with steam from the steam box 35. Clamps 130, drawn to their seats by screws 131, bear against the collars 126 and thus removably secure, with a fluid tight joint, the receiving ends of the conduits 125 within the sockets 66.

The plate 118 has a relatively large opening 133 adjacent each of the burners, and fitted within the same is a cone plate 135 having a central aperture 136 through which the burner discharges. Fastened, with the annular base flange 137 of the cone plate 135 to the inner side of the plate 118 about the opening 133, is the correspondingly shaped base flange 138 of a socket member 139. Fitting within and supported by this socket member is the outer end of a burner tube of carborundum or other suitable refractory material, the tube of the main burner being designated 140, while those of the burners 101 and 102 are designated, respectively, 141 and 142. It will be noted, especially from Figs. 9 and 11, that the tube 140 of the main burner has its inner end directed downwardly at a slight angle.

Combustion chamber (Reference characters 145–157) (Figs. 2, 4, 9 and 11)

A housing designated generally 145, that is preferably constructed of suitable refractory material, is superimposed upon the generator 5 and, as best shown in Figs. 2, 4, 9, and 11, is composed of a top wall 146, side walls 147, and a horizontal partition 148, the latter being made of two slabs that are separated (excepting throughout their marginal portions) by an air space 150, said walls and partition having interfitting parts. The interior of the housing is thus divided into a main combustion chamber 151 and an auxiliary combustion chamber 152, the bottom wall of the latter being formed by the top wall 10 of the steam generator. The partition 148 stops short of the front end of the housing (see Fig. 9) so that immediately to the rear of the burner tubes 140, 141 and 142, the main and auxiliary combustion chambers merge. The rear end of the housing 145 joins a spout-like muffle 155 (Fig. 2) also preferably of refractory material, that is extended, through an opening 156 in the front wall 157 of the furnace, into the fire box thereof. The opening 156 may be, and preferably is, that of the furnace feed door, and the muffle 155 should be of such shape as will cause it to direct the products of combustion into the furnace at an elevation best suited to the character and design of the type of heating plant with which the apparatus is intended to be used.

Damper assembly (Reference numerals 160 to 187) (Figs. 7 to 9, 27 to 30)

As previously stated, and as will be noted especially from Fig. 9, the main burner tube 140 is inclined downwardly so as to discharge its products into the auxiliary combustion chamber 152 (in the absence of any obstruction to such course), while the burner tubes 141 and 142 are so positioned as to project their products more directly into the main combustion chamber 151. Whether all or only a part of the products of combustion from the main burner, as well as from the auxiliary burners when the latter are in operation, are delivered to the main combustion chamber depends upon the position of a damper 160 (Figs. 9 and 27 to 30) that is pivotally supported at a point below the burner tubes and is adapted to swing from a position wherein it closes the opening through which the combustion chambers communicate at their forward ends, and a second position adjacent the top wall of the generator. The former position is the one hereinbefore referred to as "generator-shielding" in that, when the damper occupies such position, it intercepts the passage of the products from one or more of the burners to the auxiliary combustion chamber where they would have direct contact with the top wall of the generator.

The damper, to which the numeral 160 is generally applied, is construced of a body 161 of refractory material from the lateral edges of which wings 162 rise to a suitable height. The front end of the body 161 fits within a channel-like frame 163 that is formed with end walls 164 having apertures through which the ends of a rod 165 are engaged, the rod occupying a transverse channel 166 that is formed on the upper side of the body 161. The rod is held against longitudinal movement by cotter pins 167 that are projected through holes in the ends of the rods beyond the walls 164. The rod constitutes the sole means of fastening the body 161 to the frame 163 and, on account of the ease with which the rod can be removed, the assembly of the parts and the replacement of the body, should the same become damaged, are greatly facilitated by the arrangement described. Secured by screws 170 in depressions that are formed in the ends of the frame 163 are plates involving knife edge bearings 172 that rest within V-notches 173 of brackets 174 whose base flanges 175 are fastened by screws 176 to seats 177 that rise from the front corners of the top wall 10 of the generator. Secured by screws 179 to the front of the frame 163 is a member 180 from which a weight arm 181 projects forwardly and is equipped with a weight 182. The arm 181 preferably involves a joint 183 through which the elevation of the weight 182 with respect to the damper 160 may be adjusted, the portion of the arm to which the weight is applied being sustained by a set screw 184 that is threaded through a terminal member of the other portion of the arm. Pinned or otherwise secured within a boss 186 that is formed on the right hand end of the member 180, as the parts are viewed from the front, is one end of an L-shaped rod 187. The opposite end of said rod is disposed along the right hand side of the apparatus and to the rear of the pivotal axis of the damper so that when said end is elevated it will swing the damper to generator-shielding position, and vice versa.

Damper control mechanism (Reference numerals 190–267) (Figs. 1, 3, 4, 12, 31 to 38)

The damper control mechanism is the same in principle as that disclosed in the aforesaid application Serial No. 139,877. This mechanism is illustrated in detail in Figs. 31 to 38, inclusive, and it is supported by a bracket 190 that is attached at its lower end, by screws 191, to the rear corner of the right hand side of the steam generator. The bracket incorporates upper and lower arms 192 and 193, respectively, and rising from the inner and outer ends of the former arm are bosses 194 (Figs. 34 and 38). Also rising from the arm 192, and spaced inwardly from the bosses 194 and in laterally spaced relation to each other are lugs 195 in the tops of which are V-notches 196. Secured by screws 197 to the bosses 194 is a cap 198 which has depending lugs 199 in the lower ends of which are inverted V-notches 200. Disposed between the arm 192 and the cap 198 is a fulcrum plate 201 which has downwardly facing knife edge bearings 202 and upwardly facing knife edge bearings 203 which engage, respectively, within the V-notches 196 and 200. The edges of the several knife edge bearings are in absolute alignment, as are also the crotches of the V-notches wherein they bear, and as a consequence of this the fulcrum plate is held against vertical movement while being capable of free rocking movement on its knife edge bearings.

Sustained by the fulcrum plate 201 is an assembly of parts which we shall now describe, and because of its function shall refer to as the damper control lever, the same being designated, generally, by the reference numeral 205. The previously mentioned knife edge bearings constitute the fulcrum of this lever and, for convenience, such fulcrum is designated by the numeral 206 (Fig. 31). A unit 208 which, in the present instance, consists of a casting, is secured by a screw 209 to the upper portion of the fulcrum plate 201, and to effect and maintain a proper position of said unit with respect to the fulcrum plate, the parts are dowelled together by a pin 210. The unit 208 has a relatively narrow neck 212 which is extended forwardly through a notch 213 that is formed in the lower edge of the fulcrum plate and adjacent its forward end is extended laterally and downwardly in the form of a housing 214. Secured, as by a split pin 215 in a boss 216 that projects forwardly from the upper end of the housing 214, is a rod 217 to the front end of which is attached a fitting 218. Vertically adjustable through this fitting is a screw 219 (Fig. 31), and articulated to the lower end of this adjusting screw is the upper end of a link 220 whose lower end is pivoted to the rear end of the previously mentioned L-shaped rod 187 that is fastened to the damper frame 163. A weight 225 is adjustable along the rod 217, and this weight is intended to be so positioned that it will normally depress the outer end of the damper control lever 205 and, through the intervention of the link 220 and the rod 187, rock the damper on its knife edge bearings 172 from generator-shielding position.

As will presently appear from the detailed description of the operation of the apparatus, this action of the weight 225 is opposed by the steam pressure in the generator, and this result is accomplished through means which we will now describe. The lower arm 193 of the bracket 190 is made hollow and it communicates at its inner end, through an opening 226 in the side wall of the generator section 6 (Fig. 33), with the water space of the generator, and mounted upon the outer end of said arm is a bellows 228 whose interior communicates, through a nipple 229, with the interior of the hollow arm 193. Consequently, the steam pressure within one generator is communicated through the opening 226, the passageway of the arm 193, and the nipple 229, to the bellows 228. A rod 230 rises from the top of the bellows 228 and has its pointed upper end engaged within a conical recesss 231 in the under side of the so-called neck 212, of the damper control lever 205, forwardly of the fulcrum 206. As a consequence of this arrangement, the outer end of the damper control lever will be elevated as the steam pressure within the generator increases and, through the connections previously described, rock the damper 160 toward generator-shielding position.

With nothing further in the way of a damper control than that above described, the fire can be kept at a substantially constant heat, the intensity of which would be determined by the adjustment of the weight 225. For example, by adjusting the weight 225 outwardly from where it is shown, it would take a higher steam pressure than it would under the present adjustment to expand the bellows 228 and lift the forward end of the damper control lever 205 and swing the damper to generator-shielding position. This higher steam pressure would naturally result in the delivery of a greater amount of steam to the burner in a given period of time and consequently a greater amount of oil and the flame of the burner would be enlarged and the intensity of heat accordingly increased.

It is desired to increase and decrease the heat in accordance with the temperature of the room or enclosure that is being heated by the apparatus and this is accomplished automatically by mechanism described below.

Journaled in vertically spaced bearing 233 and 234 (Fig. 33) that are adjustably carried, respectively, by the top and bottom walls of the housing 214, is a shaft 235 on which is rotatably mounted the hub portion 236 of an arm 237 that incorporates a weight 238 at its outer end. A yieldable driving connection is effected between the shaft 235 and the weight arm 237 through a friction clutch 239. Fastened to the shaft 235 below the clutch 239 is a worm gear 240 that meshes with a worm 241 on a shaft 242. This shaft is supported at its forward end within a bearing 243 (Fig. 31) that is preferably adjustable within the front wall of the housing 214. The rear end of the shaft 242 is journaled within a bearing 245 (Fig. 36) that is carried by the web of a channel member 246. This channel member is supported by and spaced from the lower end of a vertical part 247 of the previously mentioned unit 208 by four posts or studs 248. Carried by the vertical part 247 are horizontal plates 250 between which are supported solenoids 251 and 252, the solenoids being fastened to the upper one of said plates by screws 267. Journaled in bearings carried by opposed portions of the channel member 246 and the part 247, and in substantially the same horizontal plane as the shaft 242, are stub shafts 253 and 254. Driving connection is established between shafts 242 and 254 through gears 255 and 256 that are secured to said shafts, respectively, and mesh with an intermediate gear 257 that is fastened to the shaft 253. Also secured to the respective shafts 242 and 254, rearwardly of the gears 255 and 256, are ratchet wheels 258 and 259. These ratchet wheels are adapted to be engaged by the respective pawls 260 and 261 (Fig. 35), shown as formed by lugs that are struck outwardly from plates 262 and 263. The outer edge portions of said plates are turned back upon the body portions thereof, as best shown in Fig. 36, so as to increase the weight of the outer portions of the plates for a purpose which will presently appear. The plates 262 and 263 are pivotally connected, as indicated at 265, to the movable core sections 266 of the solenoids 251 and 252. The pawl carrying plates are guided within slots in the top and bottom flanges of the channel member 246, and the distance they are permitted to swing inwardly under the influence of their weighted outer edge portions is limited by the engagement of their inclined inner edges with the shafts 242 and 254. The descent of the movable core sections 266 is limited by their engagement with the top flange of the channel member 246, and when in their lowest positions they sustain the plates 262 and 263 at such an elevation that the pawls 260 and 261 are slightly out of reach of the teeth of the ratchet wheels 258 and 259. It is clear from the construction above described that when solenoid 251 is energized and its movable core section is retracted, it will elevate the plate 262 and engage the pawl 260 that is carried thereby with a tooth of the ratchet wheel 258 and impart to said wheel, and to shaft 242 to which said wheel is secured, a partial rotation. This movement of the shaft is transmitted, through the worm 241 and worm wheel 240, to the shaft 235, thus causing the latter shaft to be rotated in a direction to swing the weight 238 forwardly. Reversely, by the energization of the solenoid 252, the weight is moved rearwardly, as is obvious from the foregoing description, it being remembered that the shaft 254, which carries the ratchet wheel 259, is actuated through the pawl 261 of plate 263 that is carried by the movable core section of solenoid 252, and that said shaft has driving connection with shaft 242 through the gears 256, 257 and 255.

The circuits through which current is supplied to the solenoids 251 and 252 will presently by described.

*Water supply and control*
(Reference numerals 270 to 330) (Figs. 1 to 6, 15 to 17)

Supported by the stand of the apparatus and located on the left side thereof is pumping apparatus designated, generally, by the reference numeral 270, and the same involves a water pumping chamber 271 and an oil pumping chamber 272 (Figs. 2 and 5). This apparatus may consist of any approved type of steam pump, and steam is supplied to the same from the steam box 35 through a pipe or conduit 273 (Figs. 2 and 4) that includes an accumulator or expansion chamber 275. The purpose of this is to effect a substantially steady supply of steam to the pumping apparatus notwithstanding fluctuations which may occur in the steam pressure within the steam box 35 due to throwing into and out of operation the auxiliary burners which derive their steam supply directly from said steam box, as previously explained.

Water is conducted to the pumping chamber 271 through a pipe 276, a water filter or separator 277, and a pipe 278 from a float tank 279 that is supported by brackets 280 from the right hand side of the stand. The tank receives its water from the city or other supply through a pipe 282, and a water level of a given height is maintained therein by a valve 283 that is actuated by a float 284.

Located within the rear portion of the stand of the apparatus, as shown in Fig. 5, is a water pre-heater or so-called heat interchanger 285 to which the water is delivered from the pumping apparatus through a pipe 286. As will presently be more fully explained, the temperature of the water will be raised as it passes through a coil 287 (Fig. 6) of the pre-heater or heat interchanger 285 from whence it is conducted through a pipe 288, involving a check valve 289, to a water control housing 290 that is located on the left hand side of the generator, as best shown in Figs. 2 and 4. The water control housing is illustrated in sectional detail in Fig. 15 where it will be seen to involve a partition 291 that separates the interior of the housing into a receiving chamber 292 and a discharge chamber 293. The previously mentioned pipe 288 enters the receiving chamber 292 on the rear side thereof, as shown in Fig. 17. The housing 290 is connected to the adjacent side of the lower section 6 of the steam generator through a neck 295 (Fig. 15) that registers with an opening 296 in the wall of the generator thereby to establish communication between the water compartment of the generator and the receiving chamber 292. The steam space of the generator communicates with the top portion of the housing 290 through a pipe 297. Fitting within the inner tapered end of a hollow boss 298 that extends from the outer side of the casing 290 is a correspondingly tapered head 299 that is clamped in place by a plug 300 that is screwed into the outer end of said boss. By reference again to Fig. 17, it will be seen that the head 299 has an inward tubular extension 301, a bore 302 of which communicates through a port 303 with a circumferential groove 304 that extends about the head. This groove, in turn, communicates with a drain port 305.

The extension 301 is externally threaded for the application of a unit 307 to which a casing 308 is attached. This casing encloses a metallic bellows 309 between which and the casing wall there is a quantity of thermal sensitive fluid, the end of the bellows adjacent the unit 307 being connected through a ring 310 to the casing 308 with a fluid tight joint. A valve seat 312 is formed on the inner end of the extension 301 about the bore 302 thereof, and arranged for cooperation with this seat is a valve 313 that is carried by a stem 314 that is guided within a sleeve extension 315 of the unit 307. A spring 316 surrounds the sleeve 315 and is compressed between the unit 307 and a spring seat 317 that is suitably secured to the end of the valve stem. This spring tends to retract the stem and thus remove the valve 313 from the seat 312; and when heat of a sufficiently high degree is appl'ed to the casing 306 the fluid contained therein will expand and compress the bellows and through the end wall 318 thereof move the valve 313 against the seat 312. The drain port 305 communicates, through a nipple 320, with the lower end of what we shall term a primary stand pipe 321. Leading off from the stand pipe 321 at a height which determines—in the instance of filling, as will hereinafter appear—the water level in the generator 5, is a pipe 322 that connects with and empties into the upper end of the casing of the heat interchanger 285. The water flows from the bottom portion of this casing, through a pipe 323, to an elevation above the top thereof where said pipe joins what we shall term a secondary stand pipe 325 that discharges at its lower end through a waste pipe 326 (Fig. 6). We may also mention at this point that the steam exhausts from the pumping apparatus 270 through a pipe 327 into the lower end portion of the secondary stand pipe 325. For the initial filling of the generator, water is by-passed from the supply pipe 282, through a pipe 328 that is controlled by a valve 329, to the lower end of the primary stand pipe 321 (Figs. 2, 3 and 5). As best shown in Fig. 2, a water gauge 330 is located on the left hand side of the apparatus and connects at its upper and lower ends with the corresponding sections of the generator 5.

*Oil system*

(Reference numerals 335 to 406) (Figs. 1, 2, 4, 5, 7 to 9, 13, 19, 20, 23 to 26)

Supported at the front left hand corner of the apparatus, by an angular bracket 335 (Fig. 4) that is suitably secured to the side of the generator, is an oil control housing that is designated, generally, by the reference numeral 336. As best shown in Figs. 23 and 24, this housing includes upper and lower compartments 337 and 338, respectively, and the former discharges through an overflow pipe 339 into a tilting bucket 340 that is located in the latter compartment and is supported, through knife edge bearings 341, in V-notches of bear'ng plates 342 that are applied to the opposite side walls of said compartment 338. A valve casing 343 (Fig. 24) is rigidly secured to the top wall of the compartment 338 where the latter extends to the left beyond the upper compartment 337, and said valve casing contains what may be termed inlet and outlet bores 344 and 345 which are of different diameters thereby to provide between them a shoulder that constitutes a valve seat 346 wherewith a valve 347 cooperates. The stem of this valve is guided within the inlet bore 344 and is flattened or cut away along one side to provide clearance for the passage of oil through the inlet bore. A spring 348 occupies the outlet bore of the valve casing and is compressed between a tubular plug 349, that is screwed into the upper end of the valve casing, and the opposed face of the valve 347.

A tilting cup 353 is located in the upper part of compartment 337 and is supported, through knife edge bearings 354, in V-notches of bearing plates 355 that are carried by the side walls of said compartment, and said cup is normally overbalanced by a weight 356 that is secured, as by a bracket 357, to the rear end of the cup. The tilting movement of the cup is limited by the engagement of the bracket 357 with opposed stops 358 that are formed by the inturned ends of a strap 359 that is attached to the adjacent wall of the housing. Adapted to rock with the cup 353 is a mercury switch 360 that is shown in the present instance as being carried, through a clip 361, by the front wall of the cup, as best shown in Fig. 20. While this is a well known type of electric switch that is especially suitable for use in the presence of inflammable liquids, gases, or explosive substances, it may be briefly described as consisting of a hermetically sealed tube of glass or the like containing a quantity of mercury which, when the tube is tilted in one direction, closes a circuit by bridging two enclosed contact points and, when the tube is tilted in the other direction, opens the circuit by withdrawing from one or both contact points. The purpose of this mercury switch or circuit closer will presently be explained.

The previously mentioned oil pumping chamber 272 of the pumping apparatus 270 receives oil through a pipe 365 that involves a check valve 366 and connects at its end opposite the pump with one branch of a T 367 (Figs. 1, 2 and 5). Another branch of this T is connected through a pipe 368 with an oil strainer 370 whose inlet 371 communicates through a pipe 372 with a suitable source of supply, such as a storage tank (not shown). The remaining branch of the T 367 is connected through a pipe 373 with the outlet end of the valve casing 343.

The oil pumping chamber 272 discharges through a pipe 375, that leads through the top portion of the rear wall of the housing 336, into the tilting cup 353.

Access to the interior of the compartment 337 may be had through its open top, the same being normally closed by a readily removable cover 378 that is provided with a sight opening fitted with a suitable transparent closure in a frame 379.

A narrow door 380, that is hinged to the upper edge of the right hand end wall of the compartment 338, affords access to said compartment; and the bottom of said compartment is formed to constitute a basin 381 that is provided with a discharge spout 382.

Projecting forwardly from the lower portion of the front wall of the compartment 337 is an outlet extension 385 (Figs. 20 and 23) to which is connected, by means of a union 386, the inlet branch 387 of a valve casing 388. The lower end of this valve casing is communicatively connected through a nipple 389 with a manifold 390. Tubes 391, 392 and 393 lead from this manifold to the oil jets of the respective burners 100, 101 and 102, the ends of said tubes remote from the manifold being connected to the bosses 111 through elbows 395. A valve seat 396 (Fig. 19) surrounds the passageway through the valve casing 388 and arranged to cooperate therewith is a valve 397 that is constituted of the tapered end of a stem 398 that is guided within a longitudinal bore of the casing 388. Said stem projects a suitable distance above the casing and is provided at its upper end with a flat head 399. The casing is counterbored a suitable distance downwardly from its upper end to receive a spring 400 which is compressed between the bottom of the counterbore and a collar 401 that is pinned or otherwise secured to the stem 398. A tubular plug 402 closes the upper end of the counterbore and constitutes a stop for the collar 401, the parts being so proportioned that the spring 400 normally maintains the valve 397 off the seat 396 thereby to permit the oil to flow from the compartment 337, through the valve casing, the nipple 389, the manifold 390, and the tubes 391, 392 and 393 to the main and auxiliary burners. Obviously, the liquid overflow 339, establishes the oil level in said tubes which level, it may be explained, is slightly below the plane of the oil jet apertures of the burners.

For the purpose of regulating the oil supply to the main burner, should the same be found desirable, we provide a needle point valve 405 (Fig. 19) that is threaded through the wall of the manifold 390 in a position to cooperate with a seat surrounding an orifice 406 that opens into the tube 391.

With the foregoing construction in mind it may be well to consider at this time the operation of the oil circulating system, and for this purpose it will be assumed that the compartment 337 contains oil to the height of the overflow tube 339, and that sufficient oil is present in the bucket 340 to cause said bucket to be overbalanced. In this position the rear end of the bucket is elevated and its bottom wall engages and lifts the stem of the valve 347, causing said valve to be maintained off its seat in opposition to the pressure of the spring 348.

With the pumping apparatus in action, oil is drawn through the valve casing 343 from the bucket 340, through the pipe 373, the T 367, passed the check valve 366, and through pipe 365 to the pumping chamber 272 from whence it is expelled through pipe 375 to the tilting cup 353. When a sufficient quantity of oil has accumulated within said cup to overbalance the weight 356 and the parts associated with it, the cup will tilt and spill its contents into the compartment 337. This tilting action of the cup 353 is intermittent and continues as long as the apparatus is in operation.

While there is enough oil in the bucket 340 to maintain it in its tilted position, the valve 347 will remain open and at least a part of the demand of the oil compartment 272 of the pumping apparatus will be satisfied from this source. The remainder of the oil demanded by the pump will be drawn through the pipe 368, the oil strainer 370, and the pipe 372 directly from the source of oil supply. When an insufficient quantity of oil is present in the bucket 340 to maintain it in its tilted position, the valve 347 will be closed by the spring 348, in which case all the oil demanded by the pump will be drawn directly from the oil supply. As best shown in Fig. 24, a plate 407 is applied to the end wall of the bucket 340 remote from that occupied by the valve casing 343, and the same is spaced from said wall by the marginal portions of the plate thereby to close between the plate and said wall a duct 408. Within the zone of said duct the upper end of the edge wall of said bucket is notched, as shown at 409, and when the bucket tilts and discharges oil, the flow is confined by the notch 409 to the duct 408.

Safety appliance (Reference numerals 410–447) (Figs. 1, 2, 4, 19 to 26)

Associated with the above described valve 397 which, as stated, is normally maintained open by the spring 400, is a safety appliance which acts automatically to close said valve and thus shut off the supply of oil to the main and auxiliary burners, in case the valve 347 should become stuck or the bucket 340 fail to tilt, or in case the apparatus becomes overheated. This safety device may also be manually operated from a remote point, through suitable connections, to shut off the oil supply to the burners in case of an emergency.

The safety appliance is best shown in Figs. 19 to 26, inclusive.

A bracket 410, shown in perspective in Fig. 21, and which is preferably formed of a sheet metal stamping, is riveted or otherwise secured to the front wall of the housing 336 in juxtaposition to the upper end of the valve casing 388. A lever 412, shown in perspective in Fig. 22, extends through slots 413 in opposed parallel portions of the bracket 410, and V-notches 414 that are formed in the lower edge of said lever rest upon knife edge bearings 415 that are disposed inwardly of the slots 413. These knife edge bearings are preferably formed integral with a plate 416 that is riveted or otherwise secured to the base of the bracket 410. By this arrangement two fulcrums designated, respectively, 412$^a$ and 412$^b$ (Figs. 19, 25 and 26) are provided for the lever 412.

Spaced forwardly of and supported from the bracket 412, through studs 418, is a plate 419; and a stub shaft 420 has its pointed ends journaled within an aperture in a laterally turned part 421 of the bracket 410 which is located at the upper right hand corner thereof, and an aperture in the opposed portion of said plate. A lever 425 is pivoted intermediate its ends on the shaft 420, and the opposite ends of said lever are designated 426 and 427. Also pivotally supported, through the medium of the shaft 420, is a plate 429, a portion of which lies along the end 427 of the lever 425 and is connected thereto by a fusible element 430. The end of the plate 429 opposite that connected to the lever 425 carries a weight 431, and the end portions of said plate 429 are offset with respect to each other to effect intermediate thereof a transverse portion 432. When said plate is permitted to swing under the influence of the weight 431 the transverse portion 432 falls upon the head 399 on the upper end of the stem 398 of valve 397, said weight being of sufficient heft to overcome the spring 400 and close said valve. The end 426 of the lever 425 has connection with one end of a toggle joint that is designated, generally, by the reference numeral 435 and is comprised of links 436 and 437. The end of the toggle joint opposite the lever 425 is pivotally supported by a stub shaft 438 whose pointed ends are journaled in apertures in opposed parts of the bracket 410 and plate 419. The respective links 436 and 437 carry pins 435$^a$ and 435$^b$ (Figs. 25 and 26) that extend laterally therefrom and over the upper edge of the lever 412.

When the parts are in normal condition the lever 412 rests on its two fulcrums 412$^a$ and 412$^b$, and the knee of the toggle joint 435 is below a straight line between the end pivots of the joint. Under the influence of the weight 431 the parts are held in this condition with the pins 435$^a$ and 435$^b$ of the links of said joint bearing upon the lever 412.

A rod 440 is pivotally connected to, and depends from, the left hand end of the lever 412, and with a hook 441 that is formed on the lower end of said rod is engaged a bale 442 of a pail or receiver 443 which, thus suspended, hangs beneath and in receiving relation to the spout 382 of the basin 381 that constitutes the bottom of the housing 336. Suspended from the end of the lever 412 opposite that to which the rod 440 is connected is a weight 445, the purpose of which will presently appear.

In case a condition arises preventing the tilting of the bucket 340, or in the event the valve 347 sticks in closed position and fails to open in response to pressure applied to its stem by an overbalanced condition of the tilting bucket, the oil which continues to be pumped into the housing 336 overflows the bucket 340 and drains through the spout 382 into the pail or receiver 443. When sufficient oil has accumulated within the pail or receiver to effect such action, the combined weight of the oil and the receiver pulls down the end of the lever 412 to which the receiver is connected through the rod 440 and rocks said lever on its fulcrum 412$^a$, causing said lever to lift the pin 435$^a$ thereby to break the knee of the toggle joint 435 and thus release the weight 431. As the weight drops, it forcibly projects the transverse portion 432 of the plate 429 against the head 399 of the valve stem 398 and depresses said stem against the tension of the spring 400 thereby to seat the valve 397 and shut off the supply of oil to the burners, thus practically immediately stopping the operation of the apparatus.

Until the pail or receiver 443, containing the oil, is removed from the rod 440, the parts will remain in the condition described, avoiding the resetting of the toggle and the suspension of the weight 431 in its normal position. The pail or receiver 443 is now removed from the rod 440 and emptied, and to avoid the apparatus being placed in condition for operation before the pail or receiver is returned to the rod, the weight 445 is employed, the same functioning as we shall now describe. The weight 445 is sufficiently heavy to overbalance the rod 440 and rock the lever 412 on its fulcrum 412$^b$, thus elevating the left hand end of the lever to a position above that normally occupied by the pin 435$^b$ when the toggle is in its normal and weight sustaining condition. As soon as the pail or receiver 443 is returned to the rod 440, the lever 412 is swung to its original condition wherein it rests on both fulcrums, and the toggle and weight may now be reset to normal position. At the same time the spring 400 lifts the valve 397 from its seat and communication between the oil supply and burners is accordingly re-established.

In case the apparatus becomes unduly overheated from any cause, the fusible element 430 is melted, releasing the plate 429 from the end 427 of the lever 425, whereupon the weight 431 will throw the plate 429 into valve depressing position thereby to close the valve and shut off the burners.

In the case of an emergency in which it is desirable to shut down the apparatus, the safety appliance may be tripped from a remote point through connections involving a rod 446 which has secured to its lower end a plate 447 that is pivoted to the knee of the toggle joint 435. By lifting the rod the toggle joint may be tripped and the weight 431 released. Also, by depressing the rod, the mechanism may be reset.

*Starting burner*

(Reference numerals 450–462) (Figs. 1, 2, 5, 9, 11, 20, 23, 24, 40)

Located directly beneath the opening 21 in the generator 5 is a pre-heating or starting burner designated generally, 450 (Figs. 1, 11 and 40). This burner is preferably of the short drum type and comprises a burner ring 451 which contains a wick of asbestos or the like and above the plane of which ring is disposed the drum 452 that encloses the usual commingling tubes 453. The burner ring communicates through a pipe 454 with a relatively shallow pan like tank 455 that is provided with a removable cover 456. This tank is supported from the frame member 3 of the stand through brackets 457, and is adapted to receive its oil supply, in measured quantity, from the compartment 337 of the housing 336. Communicating, through the rear wall of said housing, with the interior of the compartment 337 at about the normal oil level thereof, is a pipe 458 (Fig. 2) that leads to the upper end of a measuring cup 459. This cup discharges through a pipe 460 into the tank 455, the outlet of said pipe being disposed above an opening 456ª in the cover 456. The pipe 460 contains a valve 461 of a common type in which the valve is retained closed by a spring and is adapted to be opened by the depression of a button 462.

It is evident from the foregoing that, when the oil circulating system is in operation and after the compartment 337 has become filled to the height of its overflow tube 339 oil will be delivered through the pipe 458 to the measuring cup 459 until the latter is completely filled. This oil within the measuring cup is reserved for the next time it is desired to start the apparatus in operation, on which occasion the button 462 is depressed, the valve 461 thus opened, and the contents of the measuring cup 459 is drained into the tank 455 which, as previously stated, communicates with the burner ring 451 through the pipe 454. The starting burner is then lighted in the usual way and it continues to burn as long as the oil supply within the tank 455 lasts, which is calculated to be ample to create steam within the generator 5 sufficient for starting the main burner. No further attention need be given the starting burner, therefore, as it will go out when the limited quantity of oil is exhausted.

*Relief valve*

(Reference numerals 465 to 480) (Figs. 3, 4, 18)

A safety valve, shown in detail in Fig. 18, and practically identical with the above described valves that control the auxiliary burners, is mounted upon the right side of the generator and communicates with the adjacent steam dome 9 thereof through a pipe 465. This safety contrivance involves, in general, a bellows 466 that is enclosed within a casing 467 and carries a valve 468 that cooperates with a seat 469 surrounding the outlet passageway 470 to the outer end of which is applied a downwardly directed L 471. A rod 472 rises from the lower end of the bellows 466 and extends freely through an opening in a cover 473 of the casing 467, and its pointed upper end engages within a conical depression in the head 475 (see Fig. 18) of a weight arm 476 (Figs. 3 and 4) on which a weight 477 is adjustably mounted, the arm 476 being fulcrumed at 478 to the hood 479 that is fastened by screws 480 to the cover 473. The weight 477 is set to successfully resist steam pressure up to a predetermined value, and when the pressure exceeds this value it compresses the bellows in opposition to said weight and lifts the valve 468 from its seat and permits the steam to escape through the passageway 470 and L 471.

*Operation of apparatus thus far described*

To initially fill the generator to the required level, the valve 329 is opened to permit water to pass directly from the supply pipe 282 through pipe 328 to the lower end of the primary stand pipe 321 from which it flows, through the nipple 320, to the interior of the chamber 293 passed the valve 313 which, when the parts are cold as in the instance under consideration, is maintained open by the contraction of the thermo-sensitive fluid within the casing 308. The water will rise within the chamber 293, overflow the partition 291, pass through the chamber 292 and the opening 296 into the generator, until the desired liquid level is attained therein, which will be indicated by the gauge 330; and a rise of the water within the generator above said level is automatically prevented by the overflow of the primary stand pipe 321 effected through the pipe 322. The valve 329 may now be closed, and the starting burner conditioned for lighting by filling the tank 455 with oil. If the apparatus has been previously operated, in which case the measuring cup 459 is full of oil, the filling of the tank 455 may be accomplished by depressing the button 462 thereby to open the valve 461 and allow the contents of the measuring cup to drain into the tank.

The starting burner is then lighted. Its products rise through the opening 21 and pass rearwardly through the auxiliary combustion chamber above and in contact with the top wall 10 of the generator and heat the same sufficiently to create enough steam to start the operation of the main injector burner 100. The steam, rising within the domes 9, escapes through the tubes 49 and 50 (Fig. 10) into the sediment traps or collectors 44, the tubes 50 being tapered thereby to increase the velocity of the steam and by its impingement against the end walls of the chambers 45 extract therefrom particles of scale or sediment which may have been carried through from the generator. The steam then returns about the tubes 50 and rises through the openings 54 (Fig. 12) and strainers 56 into the steam box 35 from whence it passes through the port 60, and conduit 125 of the main burner, to the steam nozzle 115 thereof. The steam issuing from said nozzle across the jet orifice 117 of the oil nozzle 116 will create a suction within the latter nozzle sufficient to draw oil from the tube 391 and the oil will be projected with the steam, through the opening 136 and burner tube 140, into the combustion chamber. The mixture will be ignited by the flame of the starting burner communicated to it through an opening 160ª in the damper 160.

Under the conditions now prevailing, as previously explained, the damper 160 is in its lower or open position and as a consequence of this a portion of the main burner flame will be projected into the auxiliary combustion chamber 152 for direct contact with the top wall 10 of the generator and with the heat abstracting spuds 31 that rise therefrom. A part of the heat thus imparted to to top wall will be radiated to the water contained in the generator, and a part will be conducted thereto through the pins 33 that depend from said top wall and dip a material distance into the water.

As the steam pressure within the generator increases, such pressure will be communicated to the bellows 228 through the passageway in the bracket 193, causing said bellows to be expanded and, through the rod 230, lift the forward end of the damper control lever 205, thereby to rock the damper, through the intervention of the link 220, toward its elevated or generator-shielding position, as shown in Fig. 9. The products from the burner will now be deflected by the damper into the main combustion chamber, and this will continue until the steam pressure has dropped sufficiently to relax the bellows 228 and allow the weight 225 to depress the damper.

A part of the stream is conducted from the steam box 35 through the pipe 273, and through the expansion chamber or accumulator 275 in said pipe, to the working compartment of the pumping apparatus 270 thereby to set said apparatus in operation and effect a circulation of oil and water through the respective oil and water systems, as hereinbefore described. Thus, water is continuously fed to the generator through the pipe 278, water filter or separator 277, pipe 276, the water pumping chamber 271, pipe 286 (Figs. 5 and 6), through the coil 287 of the heat interchange and thence through pipe 288 to the chamber 292 of the water control housing 290. So long as all or a part of the casing 308 is exposed to the steam that is conducted through the pipe 297 to the housing 290, the thermo-sensitive fluid within said casing 308 will be sufficiently expanded to maintain the bellows 309 compressed and the valve 313 engaged with the seat 312. If, however, water is delivered to the chamber 292 faster than is required to satisfy the prevailing demand for steam, it overflows the partition 291 into the chamber 293 and as soon as it covers the casing 308 and thus protects it from the steam, the thermo-sensitive fluid in the casing will contract thereby permitting the bellows to elongate and the spring 316 to expand and remove the valve 313 from its seat, so that the excess water may escape through the drain pipe 320, primary stand pipe 321, pipe 322, the casing of the heat interchange 285, and pipe 323 to the secondary stand pipe 325 from whence it wastes through the pipe 326.

*Thermostatic control*

(Reference numerals 485-520) (Fig. 39)

The circuits through which the electric current is supplied to the solenoids 251 and 252 of the damper control mechanism are shown in the diagram of Fig. 39.

485 designates a so-called room thermostat that is located in the room or enclosure that derives its heat from the furnace that is fired by the apparatus. The thermostat comprises a base 486 on which is mounted a post 487 to which is fastened the thermal-sensitive element 488 that carries a tongue 489. The free end of the tongue is adapted to swing between contacts 490 and 491 which are shown as adjustable within studs 492, carried by a plate 493 that is pivoted at 494 to the base 486. At the lower extremity of the plate 493 is a pointer 495 which cooperates with a scale 496 on the base. This scale may be graduated to represent degrees of temperature, and by adjusting the plate with respect to the scale the contact points 490 and 491 may be shifted for the purpose of maintaining the approximate degree of temperature to which the pointer is directed on the scale. The range of temperature may be varied by adjusting the contact points 490 and 491 toward and from each other. This is in accordance with usual practice and will be readily understood.

A source of electric energy is represented by a battery shown conventionally at 497. Also shown more or less diagrammatically in Fig. 39 are the solenoids 251 and 252, and the oil housing 336 with its tilting cup 353 which carries the mercury switch 360 incorporating contact points 498 and 499. It will be recalled that as long as the apparatus is in operation and oil is being circulated through the housing 336, the tilting cup 353 will continue to rock back and forth thereby oscillating the mercury switch 360 and intermittently bridging the contact points 498 and 499.

When the temperature affecting the room thermostat falls below a predetermined value the tongue 489 will be caused to swing into engagement with the contact point 490 thereby establishing a circuit from the source or battery 497 through a conductor 500, post 487, element 488, tongue 489, contact point 490, conductor 501, through a switch or circuit breaker 502 (later to be described) and a conductor 503, to the winding of the solenoid 251 from whence it returns to the source or battery through a conductor 504, the intermittently bridged contact points 498 and 499 of the mercury switch 360, and a conductor 505. This results in pulsations of current passing through the winding of the solenoid 251 as long as the tongue 489 remains in engagement with the contact point 490. Upon each energization of the solenoid 251, the ratchet wheel 258 will be given a partial rotation and this is transmitted through the shaft 242, worm 241 and worm wheel 240 to the shaft 235 which carries the weight 238, resulting in said weight being moved outwardly. As a result of this, the forward end of the damper control lever 205 will be lowered and the damper 160 moved downwardly from generator-shielding position under the combined influence of the weights 238 and 225. This will permit the heat from the burner flame to again pass through the auxiliary combustion chamber 152 and into contact with the top wall of the generator thereby to increase the steam pressure and enlarge the flame, and the damper will remain in its newly assumed ineffective position until the steam pressure in the generator rises sufficiently to expand the bellows 228 in opposition to its increased load by reason of the outward movement of the weight 238; and upon the expansion of the bellows under these conditions the free end of the damper control lever will be elevated thereby to return the damper to generator-shielding position.

This relatively high steam pressure is maintained so long as the weight 238 remains in its outward position; and it is clear that the weight will continue to be moved outwardly—until it reaches its extreme forward position—as long as the tongue 489 remains in engagement with the contact point 490. When the temperature affecting the room thermostat rises sufficiently to cause the withdrawal of the tongue 489 from said contact point, the weight 238 will remain inert in its newly assumed position.

In case the temperature rises further and causes the tongue 489 to be swung into engagement with the contact point 491, a circuit will be established from the source or battery 497 through conductor 500, the elements of the thermostat including contact point 491, a conductor 506, a switch or circuit breaker 507, (like the one 502 previously referred to) a conductor 508, the winding of solenoid 252, and thence to the battery through the conductor 504, the mercury switch 360, and the conductor 505. This will cause intermittent energizations of the solenoid 252 which will result in a step-by-step rotation of the ratchet wheel 259 and this movement is transmitted through the shaft 254 and gears 256, 257, and 255 to the shaft 242, rotating said shaft in the opposite direction to that in which it was rotated by the solenoid 251 and, as a consequence thereof, the weight 238 will be gradually moved inwardly and the steam pressure will be reduced, as will be readily understood.

In cases where, by reason of extreme temperature changes, the thermostatic switch is caused to remain closed after the weight 238 has reached the limit of its movement in either direction, there would be a needless waste of current and undue drain on the battery unless provision were made to open the circuit. This is automatically accomplished by including in the solenoid circuits the switches or circuit breakers 502 and 507, above refered to, and shown particularly in Figs. 32, 37 and 39.

These switches are shown as supported through a block of insulation 510 from the top wall of the housing 214. Each switch comprises opposed leaves 511 and 512 of suitable conducting material to which the wires of the respective solenoid circuits are adapted to be connected by screws 513. A pin 514 of insulating material extends through aligned holes in the opposed leaves and carries metallic shoes 515 (Fig. 37) that are forced apart by a spring 517. The pin 514 has a shoulder adjacent its head 518 which, when the pin is forced inwardly, is adapted to engage the adjacent shoe and remove it from contact with the leaf 512, thereby to interrupt the electrical connection between the opposed leaves that is normally established through the shoes 515 and the spring 517. The heads 518 of the opposed switches are in the path of a finger 520 that is carried by the weight 238 so that as the weight swings to the limit of its movement in either direction it will engage the head of the corresponding pin 514 and depress said pin sufficiently to open the circuit in the manner just described.

*Auxiliary burner operation*

It is evident from the foregoing that fluctuations in the temperature affecting the room thermostat may be taken care of by the increasing and decreasing of the flame of the main burner within the range of said burner, but in case the outside or atmospheric temperature drops so low that it will lower the inside temperature, or that affecting the room thermostat, to such an extent that the main burner, operating at its maximum capacity, is incapable of generating enough heat to bring the inside temperature up to the desired value, one or both of the auxiliary burners are automatically thrown into operation, after which the thermostatically governed damper control mechanism will operate as above described to maintain the temperature within the room or enclosure substantially constant.

Under these more extreme outside temperature conditions the apparatus operates to first cause the main burner to attain its maximum capacity, and, since the temperature conditions are such as will cause the damper control mechanism to maintain the damper in its lower or open position, the steam pressure within the generator will continue to rise and as soon as it is great enough to lift the weight 95 that is associated with the valve mechanism of one of the auxiliary burners by the contraction of the corresponding bellows 76, the steam will escape past the valve 72 and throw said auxiliary burner into operation; and should the temperature be so low as to require a greater output of heat of the apparatus than can be effected through the operation of the main and one of the auxiliary burners, the second auxiliary burner is similarly thrown into operation. To accomplish this sequence in the operation of the auxiliary burners, the weights 95 are caused to exert different influences on their respective valves, this result being obtained in the present instance by adjusting said weights to different positions along their respective arms 93, as shown in Fig. 8.

Having thus described our invention, what we claim is:

1. In combination, a steam generator having a substantially horizontal top wall, a structure surmounting the same and enclosing a main and an auxiliary combustion chamber, the main chamber being above the auxiliary chamber and the bottom of the latter chamber being constituted of the top wall of the generator, both chambers having a common entrance, a combustion device arranged to project its products of combustion through said entrance into said combustion chambers, and a movable deflector for controlling the passage of the products to the auxiliary combustion chamber.

2. In fuel oil burning apparatus, the combination of an injector burner, a steam generator having a substantially horizontal top wall and so positioned with respect to the burner as to subject said top wall only to the heat of the burner flame, a housing surmounting the generator and including a partition spaced above the top wall of the generator and dividing the interior of the housing into a main and an auxiliary combustion chamber, the bottom wall of the latter being constituted of the top wall of the generator, the partition stopping short of the end of said housing adjacent the burner to provide communication at that point between the chambers, said chambers having a common entrance through which the burner projects its products into the chambers, a damper movably supported adjacent the forward end of the housing for controlling communication between the chambers, means tending to maintain the damper in open position, pressure fluid means constantly subjected to the steam pressure in the generator and responsive to variations therein for moving the damper to closed position thereby to interrupt communication between the chambers, and means for delivering fuel oil to the burner.

3. In fuel oil burning apparatus, the combination of an injector burner, a steam generator having a substantially flat top wall and so positioned with respect to the burner as to subject said top wall only to the heat of the burner flame, a housing surmounting the generator and including a partition spaced above and substantially parallel with the top wall of the generator and dividing the interior of the housing into a main and an auxiliary combustion chamber, the bottom wall of the latter being constituted of the top wall of the generator, said partition stopping short of the end of said housing adjacent the burner to provide communication at that point between the chambers, said chambers having a common entrance through which the burner projects its products into the chambers, a damper pivotally supported beneath the burner for controlling communication between said chambers, a weight tending to move the damper to open position so as to establish communication between the main and auxiliary combustion chambers, pressure fluid means constantly subjected to the steam pressure in the generator and responsive to variations therein for opposing said weight, and means for supplying fuel oil to the burners.

4. In fuel oil burning apparatus, the combination of an injector burner, a steam generator having a top wall so positioned with respect to the burner as to subject said top wall to the heat of the burner flame, a housing surmounting the generator and incorporating a partition spaced above the top wall and dividing the interior of the housing into a main and an auxiliary combustion chamber, there being a passageway at the forward end of said partition through which the two chambers communicate, a movably supported damper below the burner for closing said passageway, means tending to maintain the damper in a position in which said passageway is opened, pressure fluid means subjected to the steam pressure in the generator for moving the damper in a direction to close the passageway, a starting burner arranged to discharge its products into the auxiliary combustion chamber below said partition, the damper having an opening through which the flame of the starting burner may be communicated to the injector burner, and means for supplying fuel oil to the injector burner.

5. In fuel oil burning apparatus, the combination of an injector burner, a steam generator involving a top wall and so positioned with respect to the burner as to subject the top wall to the heat of the burner flame, the generator having a substantially vertical flue surrounded by the water compartment of the generator, a starting burner arranged to discharge its products through said flue into lighting relation to the injector burner, a conduit through which steam is conducted from the steam generator to the injector burner, and means for delivering fuel oil to the latter burner.

6. In fuel oil burning apparatus, the combination of an injector burner, a steam generator subjected to the heat of the burner flame, a starting burner arranged in operative relation to the generator, a reservoir from which oil is supplied to the starting burner, a tank from which oil is supplied to the injector burner, means for maintaining a substantially constant level of oil in said tank, a measuring cup into which oil overflows from the tank when the oil within the tank attains said level, a conduit from which the measuring cup discharges into the reservoir of the starting burner, a valve in said conduit, and means for delivering steam from the generator to the injector burner.

7. In fuel oil burning apparatus, the combination of a steam generator, means for maintaining a substantially constant water level therein, a housing surmounting the generator and enclosing a combustion chamber to the interior of which the top portion only of the generator is exposed, a combustion device arranged to project its products into the combustion chamber, a deflector supported for movement between an ineffective position and one in which it shields the generator from the products, and means for moving the deflector between said positions.

8. In fuel oil burning apparatus, the combination of a steam generator, means for maintaining a substantially constant water level therein, a housing surmounting the generator and enclosing a two-part combustion chamber above the generator and to the lower portion of one part of which the top portion only of the generator is exposed, a combustion device arranged to project its products into the combustion chamber, and a movably supported deflector for governing the passage of products to the part of the combustion chamber to which the generator is exposed.

9. In fuel oil burning apparatus, the combination of a steam generator, means for maintaining a substantially constant water level therein, a housing surmounting the generator, said housing enclosing a two-part combustion chamber with said posts arranged one above the other and to the lower portion of the lower part of which the top portion only of the generator is exposed, a combustion device arranged to project its products into the combustion chamber, and a movably supported deflector for governing the passage of products to the lower part of the combustion chamber to which the generator is exposed.

In testimony whereof, we hereunto affix our signatures.

LEE S. CHADWICK.
MARC RESEK.